(12) United States Patent
Saito

(10) Patent No.: US 8,545,000 B2
(45) Date of Patent: Oct. 1, 2013

(54) INK COMPOSITION, INK SET AND IMAGE FORMATION METHOD

(75) Inventor: Ryo Saito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 374 days.

(21) Appl. No.: 12/861,830

(22) Filed: Aug. 24, 2010

(65) Prior Publication Data

US 2011/0043566 A1 Feb. 24, 2011

(30) Foreign Application Priority Data

Aug. 24, 2009 (JP) ................................. 2009-193703

(51) Int. Cl.
*B41J 2/01* (2006.01)

(52) U.S. Cl.
USPC .............................. 347/100; 347/95; 523/160

(58) Field of Classification Search
USPC ............... 347/100, 95, 96, 101, 20, 21, 9, 88, 347/99; 106/31.27, 31.13, 31.6; 523/160, 523/161
See application file for complete search history.

(56) References Cited

U.S. PATENT DOCUMENTS

| | | | | |
|---|---|---|---|---|
| 2002/0096085 A1* | 7/2002 | Gotoh et al. | ............... | 106/31.86 |
| 2003/0119938 A1 | 6/2003 | Wang et al. | | |
| 2004/0030002 A1* | 2/2004 | Tsuru et al. | ................... | 523/160 |
| 2007/0149646 A1* | 6/2007 | Nagashima | ................... | 523/160 |

FOREIGN PATENT DOCUMENTS

| | | | | | |
|---|---|---|---|---|---|
| JP | 2000-044852 | | 2/2000 | | |
| JP | 2000-053897 A | | 2/2000 | | |
| JP | 2000053897 A | * | 2/2000 | ............ | C09D 11/00 |
| JP | 2003-238873 | | 8/2003 | | |
| JP | 2008-150524 | | 7/2008 | | |
| JP | 2009-084501 A | | 4/2009 | | |
| JP | 2009084501 A | * | 4/2009 | ................ | B41J 2/01 |
| JP | 2009-132766 | | 6/2009 | | |
| WO | WO 2007126145 A2 | * | 11/2007 | ............ | C09D 17/00 |

OTHER PUBLICATIONS

Partial English language translation of the following: Office action dated May 28, 2013 from the Japanese Patent Office in a Japanese patent application corresponding to the instant patent application. This office action translation is submitted now in order to supplement the understanding of patent document JP 2008-150524, JP2003-238873, JP2000-044852 and JP2009-132766 which are cited in the office action and are being disclosed in the instant Information Disclosure Statement.

* cited by examiner

*Primary Examiner* — Minish S Shah
(74) *Attorney, Agent, or Firm* — Solaris Intellectual Property Group, PLLC

(57) ABSTRACT

An ink composition includes a wetting agent and water-insoluble polymer particles including a colorant and a water-insoluble polymer, wherein the content of free polymer derived from the water-insoluble polymer is 1.0% by mass or less with respect to the total mass of the ink composition, and the wetting agent is at least one selected from the group consisting of urea, a urea derivative, a pyrrolidone derivative, an alkyl glycine represented by the following Formula I, glycyl betaine and a sugar: (Formula I) $R_1 R_2NCH_2COOM$ wherein in Formula I, $R_1$ and $R_2$ each independently represent a linear or branched alkyl group having 1 to 5 carbon atoms, and M represents a hydrogen atom, an alkali metal atom or an alkaline earth metal atom.

16 Claims, 2 Drawing Sheets

INK COMPOSITION, INK SET AND IMAGE FORMATION METHOD

CROSS-REFERENCE TO RELATED APPLICATION

This application claims priority under 35 USC 119 from Japanese Patent Application No. 2009-193703, filed on Aug. 24, 2009, the disclosure of which is incorporated by reference herein.

BACKGROUND OF THE INVENTION

1. Field of the Invention

The invention relates to an ink composition, an ink set and an image formation method.

2. Description of the Related Art

In view of recent demand for high-speed printing, an ink jet recording apparatus equipped with a line head, which includes a large number of nozzles formed in lines such that the width of the line head is the same as the width of a sheet of a certain size, is proposed.

In this liquid jetting apparatus including a line head, the head does not perform scanning Therefore, if clogging occurs in part of the large number of nozzles arranged in lines, it is not possible to perform supplemental printing with other nozzles that are not clogged. Accordingly, in such a liquid jetting device having a line head, there is demand for ink that causes less nozzle clogging, as well as need for new countermeasures for preventing nozzle clogging.

Under such circumstances, as an aqueous ink that is said to exhibit excellent image quality and print density, Japanese Patent Application Laid-Open (JP-A) No. 2009-084501, for example, discloses an aqueous ink including a water-insoluble polymer containing a pigment and having a content of a free polymer derived from the water-insoluble polymer of 0.40% by weight or less.

Further, as an aqueous ink that is said to achieve suppressed ink jetting defects and improved jetting droplet accuracy and print density, JP-A No. 2000-053897, for example, discloses an aqueous ink for inkjet recording that is formed from a polymer emulsion prepared by impregnating polymer fine particles with a colorant, the aqueous ink including at least one kind of compound A selected from the group consisting of urea, alkyl glycine and glycyl betaine, and at least one kind of compound B selected from the group consisting of a compound represented by $R_1COOM$, a compound represented by $R_1OPO_3M_2$ or a compound represented by $R_1OR_2OPO_2M$ (in the formulae, $R_1$ and $R_2$ each represent an alkyl or alkenyl group having 7 to 10 carbon atoms, and M represents a monovalent ion).

SUMMARY OF THE INVENTION

In the case of JP-A No. 2009-084501, there are problems in that the ink tends to adhere to a nozzle member since the polymer in the ink is water-insoluble, and that the ink itself tends to bubble.

In the case of JP-A No. 2000-053897, there are problems in that the ink tends to adhere to a nozzle member since the polymer in the ink is water-insoluble, which is also attributable to the free polymer included in the ink, and that the ink tends to bubble.

In particular, in the recently developed inkjet recording apparatuses having a line head, occurrence of nozzle clogging and difficulty in removing the clogging by maintenance have become problematic. However, neither JP-A No. 2009-084501 nor JP-A No. 2000-053897 provides an ink that exhibits sufficient jetting stability and maintainability.

The present invention has been made in view of the above circumstances and provides an ink composition, an ink set and an image formation method.

According to a first aspect of the invention, there is provided an ink composition including a wetting agent and water-insoluble polymer particles including a colorant and a water-insoluble polymer, wherein the content of free polymer derived from the water-insoluble polymer is 1.0% by mass or less with respect to the total mass of the ink composition, and the wetting agent is at least one selected from the group consisting of urea, a urea derivative, a pyrrolidone derivative, an alkyl glycine represented by the following Formula 1, glycyl betaine and a sugar:

$$R_1R_2NCH_2COOM \quad \text{(Formula 1)}$$

wherein in Formula 1, $R_1$ and $R_2$ each independently represent a linear or branched alkyl group having 1 to 5 carbon atoms, and M represents a hydrogen atom, an alkali metal atom or an alkaline earth metal atom.

According to a second aspect of the invention, there is provided an ink set including the ink composition according to the first aspect of the invention.

According to a third aspect of the invention, there is provided an image formation method including forming an image by jetting the ink composition according to the first aspect of the invention from plural jetting ports that are arranged in a two-dimensional matrix.

BRIEF DESCRIPTION OF THE DRAWINGS

Embodiments of the invention will be described in detail based on the following figures, wherein.

DETAILED DESCRIPTION OF THE INVENTION

<Ink Composition>

Figure 1:
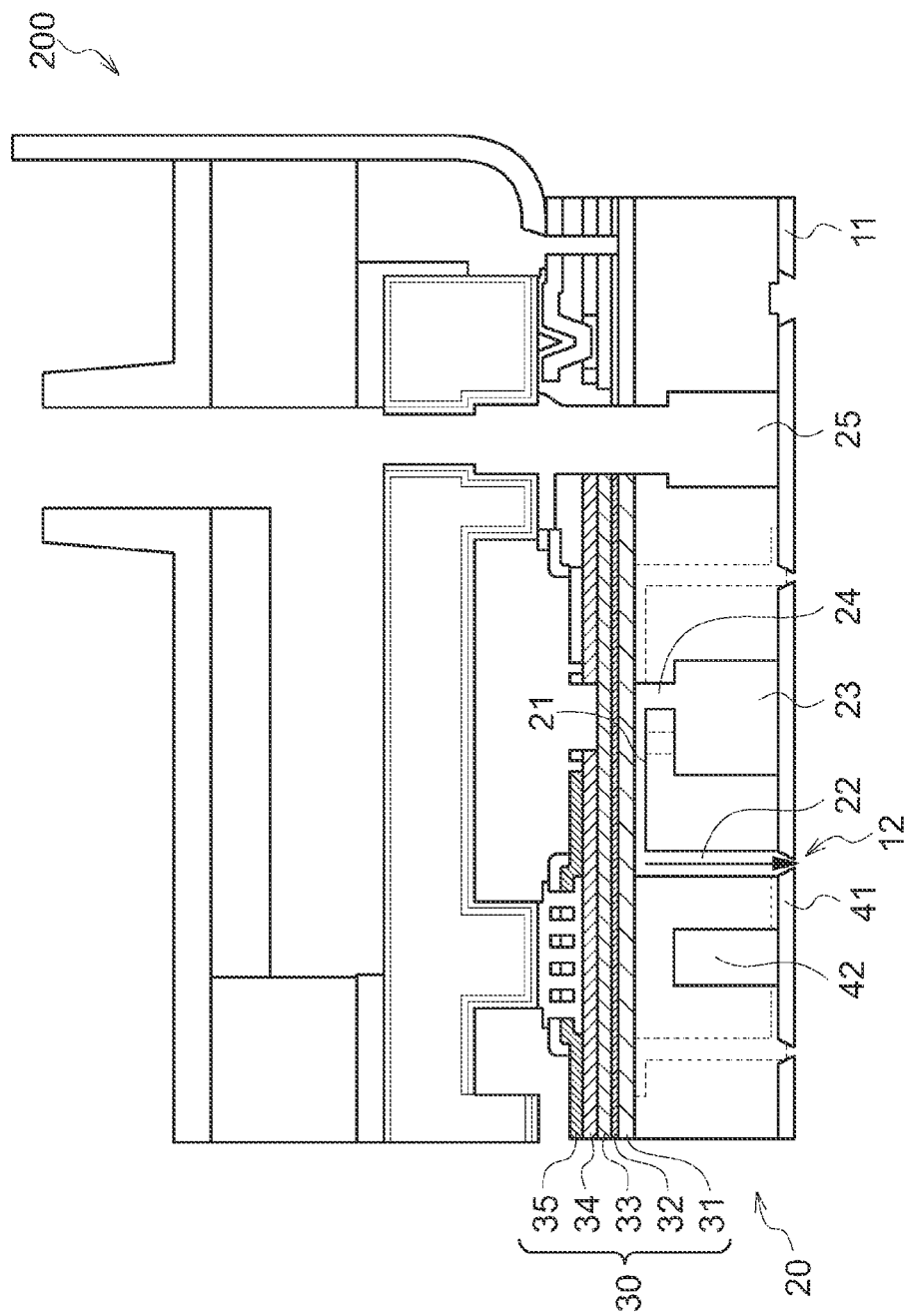
FIG. 1 is a schematic sectional view showing an embodiment of an internal structure of an inkjet head.

The ink composition according to the invention includes water-insoluble polymer particles containing a colorant and a wetting agent, wherein the content of a free polymer derived from the water-insoluble polymer is 1.0% by mass or less with respect to the total mass of the ink, and the wetting agent includes at least one selected from the group consisting of urea, a urea derivative, a pyrrolidone derivative, an alkyl glycine represented by the following Formula (1), glycyl betaine and a sugar.

When having the composition as described above, the ink composition according to the invention exhibits excellent jetting stability and cleanability.

Water-Insoluble Polymer Particles

The water-insoluble polymer particles used in the invention are colored particles including at least one of colorant and a water-insoluble polymer.

Examples of the water-insoluble polymers include water-insoluble vinyl polymer, water-insoluble ester polymer and water-insoluble urethane polymer. Among these, from the viewpoint of stability of aqueous dispersion, water-insoluble vinyl polymer is preferred. In the present specification, the water-insoluble polymer refers to a polymer in which the dissolving amount of the polymer in 100 g of water at 25° C.

after being dried at 105° C. for 2 hours, is 10 g or less, preferably 5 g or less, and further preferably 1 g or less.

When the water-insoluble polymer has a salt-forming group, the dissolving amount of the water-insoluble polymer refers to the dissolving amount of the water-insoluble polymer whose salt-forming group is neutralized to 100% with acetic acid or sodium hydroxide depending on the type of the salt-forming group.

When the colorant is a pigment, the ink composition according to the invention is preferably prepared by including the colorant in the water-insoluble polymer particles, in view of dispersion stability, water resistance, jetting ability, print density or the like.

In order to provide jetting stability and cleanability, the water-insoluble polymer is preferably a polymer that includes at least a structural unit derived from a monomer having a salt-forming group (a), and a structural unit derived from a styrene macromer (b) and/or a hydrophobic monomer (c). More preferably, the water-insoluble polymer is a water-insoluble graft polymer that includes a structural unit derived from a monomer having a salt-forming group (a) and a structural unit derived from a styrene macromer (b).

The water-insoluble graft polymer preferably has a polymer including a structural unit derived from a monomer having a salt-forming group (a) and a structural unit derived from a hydrophobic monomer (c) in its main chain, and a structural unit derived from a styrene macromer (b) in its side chain.

The water-insoluble polymer as described above is preferably a water-insoluble vinyl polymer formed by copolymerizing a mixture of monomers that includes a monomer having a salt-forming group (a) (hereinafter, also referred to as "component (a)"), a styrene macromer (b) (hereinafter, also referred to as "component (b)" and/or a hydrophobic monomer (c) (hereinafter, also referred to as "component (c)". Hereinafter, this mixture of monomers is also referred to as "monomer mixture".

(Monomer Having Salt-Forming Group (a))

The monomer having a salt-forming group (a) is used from the viewpoint of enhancing dispersion stability of the obtained dispersion, or the like. Examples of the salt-forming group include a carboxyl group, a sulfonic group, a phosphoric group, an amino group and an ammonium group.

Examples of component (a) include cationic monomers and anionic monomers. Examples of the cationic monomers and anionic monomers include a compound such as those described in page 5, column 7, line 24 to column 8, line 29 of JP-A No. 9-286939.

Representative examples of the cationic monomer include unsaturated amino group-containing monomers and unsaturated ammonium salt-containing monomers. Among these, N,N-dimethylaminoethyl (meth)acrylate and N—(N',N'-dimethylaminopropyl) (meth)acrylamide are preferred.

Representative examples of the anionic monomer include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethyl succinic acid.

Examples of the unsaturated sulfonic acid monomers include styrene sulfonic acid, 2-acrylamide-2-methylpropane sulfonic acid, 3-sulfopropyl (meth)acrylate and bis-(3-sulfopropyl)-itaconate.

Examples of the unsaturated phosphoric acid monomers include vinyl phosphonic acid, vinyl phosphate, bis(methacryloyloxyethyl)phosphate, diphenyl-2-acryloyloxyethylphosphate, diphenyl-2-methacryloyloxyethyl phosphate and dibutyl-2-acryloyloxyethylphosphate.

Among the above anionic monomers, unsaturated carboxylic acid monomers are preferred, and acrylic acid or methacrylic acid is more preferred, in view of dispersion stability, jetting ability or the like.

(Styrene Macromer (b))

A styrene macromer (b) (hereinafter, simply referred to as "macromer" sometimes) is used from the viewpoint of enhancing dispersion stability of the water-insoluble polymer particles including a pigment, or the like, by increasing its compatibility with the colorant (in particular, a pigment). Examples of the styrene macromers (b) include a macromer that is a monomer having a number average molecular weight of from 500 to 100,000, preferably from 1,000 to 10,000, and having a polymerizable functional group such as an unsaturated group or the like at one terminal thereof.

The number average molecular weight of component (b) is measured by gel permeation chromatography using polystyrene as a standard substance, and as a solvent, tetrahydrofuran including acetic acid in an amount of 50 mmol/L.

The macromer as component (b) preferably has a hydrophobic graft chain in view of enhancing the compatibility with the pigment.

The styrene macromer refers to a macromer having a structural unit derived from a styrene monomer such as styrene, α-methyl styrene or vinyl toluene. Among these styrene monomers, styrene is preferred.

Examples of the styrene macromer include a styrene homopolymer having a polymerizable functional group at one terminal thereof, and a copolymer of styrene and another monomer having a polymerizable functional group at one terminal thereof. The polymerizable functional group that exists at one terminal is preferably an acryloyloxy group or a methacryloyloxy group. By copolymerizing these, a water-insoluble graft polymer having a structural unit derived from a styrene macromer can be obtained.

The content of the structural unit derived from a styrene monomer in the styrene macromer is preferably 60% by mass or more, more preferably 70% by mass or more, particularly preferably 90% by mass or more, from the viewpoint of pigment dispersibility.

Examples of styrene macromers commercially available include AS-6, AS-6S, AN-6, AN-6S, HS-6 and HS-6S, trade name, all are available from Toagosei Co., Ltd.

(Hydrophobic Monomer (c))

A hydrophobic monomer (c) is used from the viewpoint of improving dispersion stability of a water-resistant colorant, reducing the amount of free polymer, or the like, and examples thereof include alkyl (meth)acrylate, alkyl (meth)acrylamide, an aromatic ring-containing monomer, and a monomer or a compound thereof that can form a repeating unit represented by the following Formula (1) or the following Formula (2), in the water-insoluble polymer.

Examples of the alkyl (meth)acrylate include (meth)acrylic acid esters having an alkyl group having 1 to 22 carbon atoms, such as methyl (meth)acrylate, ethyl (meth)acrylate, (iso)propyl (meth)acrylate, (iso or tertiary)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate.

Examples of the alkyl (meth)acrylamide include (meth)acrylamides having an alkyl group having 1 to 22 carbon atoms, such as methyl (meth)acrylamide, dimethyl (meth)

acrylamide, diethyl (meth)acrylamide, dibutyl (meth)acrylamide, t-butyl (meth)acrylamide, octyl (meth)acrylamide and dodecyl (meth)acrylamide.

Examples of the aromatic ring-containing monomers include styrene monomers such as styrene, 2-methyl styrene or vinyl toluene; aryl esters of (meth)acrylic acid such as benzyl (meth)acrylate or phenoxyethyl (meth)acrylate, and vinyl monomers having an aromatic hydrocarbon group having 6 to 22 carbon atoms such as ethylvinylbenzene, 4-vinylbiphenyl, 1,1-diphenylethylene, vinylnaphthalene or chlorostyrene.

In the present specification, the expression "(iso or tertiary)" refers to iso or tertiary or normal, and "(iso)" refers to iso or normal. The expression "(meth)acrylate" encompasses both acrylate and methacrylate.

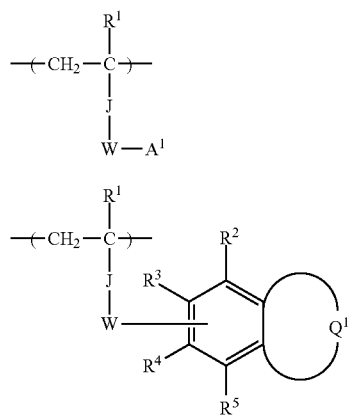

Formula (1)

Formula (2)

In Formula (1) and Formula (2), $R^1$ represents a hydrogen atom or a substituent. One of $R^2$ to $R^5$ represents a single bond that is bound to W, and the others each independently represent a hydrogen atom or a substituent. J represents *—CO—, *—COO—, *—CONR$^{10}$—, *—COO—, a methylene group, a phenylene group or *—C$_6$H$_4$CO—. $R^{10}$ represents a hydrogen atom, an alkyl group, an aryl group or an aralkyl group. W represents a single bond or a divalent linking group. $A^1$ represents a hetero ring group. $Q^1$ represents a group of atoms that is necessary for forming a ring together with a carbon atom. *- represents a bond to be bound to the main chain.

Examples of the substituent represented by $R^1$ to $R^5$ include a monovalent substituent (hereinafter, referred to as Z). Examples of the monovalent substituent include an alkyl group (an alkyl group having preferably 1 to 30 carbon atoms, more preferably 1 to 20 carbon atoms, particularly preferably 1 to 10 carbon atoms, such as a methyl group, an ethyl group, an iso-propyl group, a tert-butyl group, an n-octyl group, an n-decyl group or an n-hexadecyl group), a cycloalkyl group (a cycloalkyl group having preferably 3 to 30 carbon atoms, more preferably 1 to 20 carbon atoms, particularly preferably 3 to 10 carbon atoms, such as a cyclopropyl group, a cyclopentyl group or a cyclohexyl group), an alkenyl group (an alkenyl group having preferably 2 to 30 carbon atoms, more preferably 2 to 20 carbon atoms, particularly preferably 2 to 10 carbon atoms, such as a vinyl group, an allyl group, a 2-butenyl group or a 3-pentenyl group), an alkynyl group (an alkynyl group having preferably 2 to 30 carbon atoms, more preferably 2 to 20 carbon atoms, particularly preferably 2 to 10 carbon atoms, such as a propargyl group or a 3-pentynyl group), an aryl group (an aryl group having preferably 6 to 30 carbon atoms, more preferably 6 to 20 carbon atoms, particularly preferably 6 to 12 carbon atoms, such as a phenyl group, a p-methylphenyl group, a naphthyl group or an anthranil group), an amino group (an amino group having preferably 0 to 30 carbon atoms, more preferably 0 to 20 carbon atoms, particularly preferably 0 to 10 carbon atoms, such as an amino group, a methylamino group, a dimethylamino group, a diethylamino group, a dibenzylamino group, a diphenylamino group or a ditolylamino group), an alkoxy group (an alkoxy group having preferably 1 to 30 carbon atoms, more preferably 1 to 20 carbon atoms, particularly preferably 1 to 10 carbon atoms, such as a methoxy group, an ethoxy group, a butoxy group or a 2-ethylhexyloxy group), an aryloxy group (an aryloxy group having preferably 6 to 30 carbon atoms, more preferably 6 to 20 carbon atoms, particularly preferably 6 to 12 carbon atoms, such as a phenyloxy group, a 1-naphthyloxy group or a 2-naphthyloxy group), a heterocyclic oxy group (a heterocyclic oxy group having preferably 1 to 30 carbon atoms, more preferably 1 to 20 carbon atoms, particularly preferably 1 to 12 carbon atoms, such as a pyridyloxy group, a pyrazyloxy group, a pyrimidyloxy group or a quinolyloxy group), an acyl group (an acyl group having preferably 1 to 30 carbon atoms, more preferably 1 to 20 carbon atoms, particularly preferably 1 to 12 carbon atoms, such as an acetyl group, a benzoyl group, a formyl group or a pivaloyl group), an alkoxycarbonyl group (an alkoxycarbonyl group having preferably 2 to 30 carbon atoms, more preferably 2 to 20 carbon atoms, particularly preferably 2 to 12 carbon atoms, such as a methoxycarbonyl group or an ethoxycarbonyl group), an aryloxycarbonyl group (an aryloxycarbonyl group having preferably 7 to 30 carbon atoms, more preferably 7 to 20 carbon atoms, particularly preferably 7 to 12 carbon atoms, such as a phenyloxycarbonyl group), an acyloxy group (an acyloxy group having preferably 1 to 30 carbon atoms, more preferably 1 to 20 carbon atoms, particularly preferably 1 to 10 carbon atoms, such as an acetoxy group or a benzoyloxy group), an acylamino group (an acylamino group having preferably 1 to 30 carbon atoms, more preferably 1 to 20 carbon atoms, particularly preferably 1 to 10 carbon atoms, such as an acetylamino group or a benzoylamino group), an alkoxycarbonylamino group (an alkoxycarbonylamino group having preferably 2 to 30 carbon atoms, more preferably 2 to 20 carbon atoms, particularly preferably 2 to 12 carbon atoms, such as a methoxycarbonylamino group), an aryloxycarbonylamino group (an aryloxycarbonylamino group having preferably 7 to 30 carbon atoms, more preferably 7 to 20 carbon atoms, particularly preferably 7 to 12 carbon atoms, such as a phenyloxycarbonylamino group), a sulfonylamino group (a sulfonylamino group having preferably 1 to 30 carbon atoms, more preferably 1 to 20 carbon atoms, particularly preferably 1 to 12 carbon atoms, such as a methanesulfonylamino group or a benzenesulfonylamino group), a sulfamoyl group (a sulfamoyl group having preferably 0 to 30 carbon atoms, more preferably 0 to 20 carbon atoms, particularly preferably 0 to 12 carbon atoms, such as a sulfamoyl group, a methylsulfamoyl group, a dimethylsulfamoyl group or a phenylsulfamoyl group), a carbamoyl group (a carbamoyl group having preferably 1 to 30 carbon atoms, more preferably 1 to 20 carbon atoms, particularly preferably 1 to 12 carbon atoms, such as a carbamoyl group, a methylcarbamoyl group, a diethylcarbamoyl group or a phenylcarbamoyl group), an alkylthio group (an alkylthio group having preferably 1 to 30 carbon atoms, more preferably 1 to 20 carbon atoms, particularly preferably 1 to 12 carbon atoms, such as a methylthio group or an ethylthio group), an arylthio group (an arylthio group having preferably 6 to 30 carbon atoms, more preferably 6 to 20 carbon atoms, particularly preferably 6 to 12 carbon atoms, such as a phenylthio group), a heterocyclic thio group (a heterocyclic thio group having preferably 1 to 30 carbon atoms, more preferably 1 to 20 carbon atoms, particularly preferably 1 to 12 carbon atoms, such as a pyridylthio group, a 2-benzimidazolylthio group, a 2-benzoxazolylthio group or a 2-benzthiazolylthio group), a sulfonyl group (a sulfonyl group having preferably 1 to 30 carbon atoms, more preferably 1 to 20 carbon atoms, particularly preferably 1 to 12 carbon atoms, such as a mesyl group or a tosyl group), a sulfinyl group (a sulfinyl group having preferably 1 to 30 carbon atoms, more preferably 1 to 20 carbon atoms, particularly preferably 1 to 12 carbon atoms, such as a methanesulfinyl group or a benzenesulfinyl group), a ureido group (a ureido group having preferably 1 to 30 carbon atoms, more preferably 1 to 20 carbon atoms, particularly preferably 1 to 12 carbon atoms, such as a ureido group, a methylureido group or a phenylureido group), an amido phosphate group (an amido phosphate group having preferably 1 to 30 carbon atoms, more preferably 1 to 20 carbon atoms, particularly preferably 1 to 12 carbon atoms, such as a diethyl amido phosphate group or a phenyl amido phosphate group), a hydroxyl group, a mercapto group, a halogen atom (such as a fluorine atom, a chlorine atom, a bromine atom or an iodine atom, more preferably a fluorine atom), a cyano group, a sulfo group, a carboxyl group, an oxo group, a nitro group, a hydroxamic group, a sulfino group, a hydrazino group, an imino group, a heterocyclic group (a heterocyclic group having preferably 1 to 30 carbon atoms, more preferably 1 to 12 carbon atoms, and preferred examples of hetero atoms include a nitrogen atom, an oxygen atom, and a sulfur atom, such as an imidazolyl group, pyridyl group, a quinolyl group, a furyl group, a thienyl group, a piperidyl group, a morpholino group, a benzoxazolyl group, a benzimidazolyl group, a benzthiazolyl group, a carbazolyl group or an azepinyl group), a silyl group (a silyl group having preferably 3 to 40 carbon atoms, more preferably 3 to 30 carbon atoms, particularly preferably 3 to 24 carbon atoms, such as a trimethylsilyl group or a triphenylsilyl group), and a silyloxy group (a silyloxy group having preferably 3 to 40 carbon atoms, more preferably 3 to 30 carbon atoms, particularly preferably 3 to 24 carbon atoms, such as a trimethylsilyloxy group or a triphenylsilyloxy group). These substituents may be further substituted by one or more substituents selected from the aforementioned substituents Z.

Among the above, $R^1$ is preferably a hydrogen atom, an alkyl group or an aryl group, and more preferably a hydrogen atom or an alkyl group.

The group represented by $R^2$ to $R^5$ other than the single bond to be bound to W is preferably a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonyl amino group, a sulfonylamino group, a carbamoyl group, a sulfonyl group, a hydroxy group, a halogen atom, a cyano group, a carboxyl group, a nitro group or a heterocyclic group; more preferably a hydrogen atom, an alkyl group, an aryl group, an amino group, an alkoxy group, an aryloxy group, an acyl group, an acylamino group, a sulfonylamino group, a carbamoyl group, a sulfonyl group, a hydroxyl group, a halogen atom or a cyano group; and further preferably a hydrogen atom, an acyl group, a hydroxyl group, a halogen atom or a cyano group.

In Formulae (1) and (2), J represents *—CO—, *—COO—, *—CONR$^{10}$—, *—COO—, a methylene group, a phenylene group or *—$C_6H_4$CO—. * represents a site to be bound at the main chain. Among the above, J is preferably *—CO—, *—CONR$^{10}$—, a phenylene group or *—$C_6H_4$CO—, and more preferably *—$C_6H_4$CO—. $R^{10}$ represents a hydrogen atom, an alkyl group, an aryl group or an aralkyl group, and preferably a hydrogen atom, an alkyl group or an aryl group. The preferred ranges thereof are defined in the same manner as those of the alkyl group and the aryl group explained in the above section concerning substituent Z.

In Formulae (1) and (2), W represents a single bond or a divalent linking group.

Examples of the divalent linking group include an imino group, a straight-chain, branched or cyclic alkylene group (an alkylene group having preferably 1 to 30 carbon atoms, more preferably 1 to 12 carbon atoms, further preferably 1 to 4 carbon atoms, such as a methylene group, an ethylene group, a propylene group, a butylene group, a pentylene group, a hexylene group, an octylene group or a decylene group), an aralkylene group (an aralkylene group having preferably 7 to 30 carbon atoms, more preferably 7 to 13 carbon atoms, such as a benzylidene group or a cinnamylidene group), an arylene group (an arylene group having preferably 6 to 30 carbon atoms, more preferably 6 to 15 carbon atoms, such as a phenylene group, a cumenylene group, a mesitylene group, a tolylene group or a xylylene group), *—$(CR^{11}R^{12})_n$NH-CONH— and *—$(CR^{11}R^{12})_n$CONH—. * represents a site to be bound at the main chain. $R^{11}$ and $R^{12}$ each independently represent a hydrogen atom or a substituent, preferably a hydrogen atom, an alkyl group, a halogen atom or a hydroxyl group, more preferably a hydrogen atom or an alkyl group, and further preferably a hydrogen atom. When there are two or more of $R^{11}$ or two or more of $R^{12}$, each of $R^{11}$ or $R^{12}$ may be the same or different. n represents a positive integer, preferably 1 to 10, and more preferably 2 to 5. Among these, the divalent linking group is preferably *—$(CR^{11}R^{12})_n$NH-CONH—, *—$(CR^{11}R^{12})_n$CONH— or an imino group, and more preferably an imino group.

W preferably represents a single bond, an alkylene group or an arylene group, more preferably a single bond or an alkylene group, and further preferably a single bond.

W may further have a substituent, and examples of the substituent include those explained in the above section concerning Z. Further, W may be formed by combining two or more of the divalent linking groups. It is also preferred that W includes an ether bond therein.

In Formula (1), $A^1$ represents a heterocyclic group. In the present invention, the heterocyclic group refers to a monovalent group obtained by removing one hydrogen atom from a heterocyclic compound.

The heterocyclic group represented by $A^1$ is preferably a heterocyclic group that can form a colorant (in particular, a pigment). By having a heterocyclic group that exhibits high compatibility with the pigment via van der waals interaction, favorable adsorption properties with respect to the pigment may be achieved and a stable dispersion may be obtained.

The heterocyclic compound that forms the heterocyclic group is preferably a heterocyclic compound having at least one hydrogen bond group in its molecule, and examples thereof include thiophene, furan, xanthene, pyrrole, imidazole, isoindoline, isoindolinone, benzimidazolone, indole, quinoline, carbazole, acridine, acridone, quinacridone, anthraquinone, phthalimide, chinaldine and quinophthalone. Among these, benzimidazolone, indole, quinoline, carbazole, acridine, acridone, anthraquinone and phthalimide are particularly preferred.

The heterocyclic group is particularly preferably a heterocyclic group that is similar to the pigment to be used.

Specifically, in the invention, at least one selected from acridone, anthraquinone or the like is particularly preferably used with respect to a quinacridone pigment. These compounds may strengthen the adsorption of the water-insoluble polymer and the colorant, and may reduce the amount of polymer desorbed from the colorant, irrespective of the type or the amount of solvent used as the ink solvent.

In Formula (2), $Q^1$ represents a group of atoms that are necessary to form a ring together with carbon atoms (i.e., the two carbon atoms of —C=C—). A ring may be formed by this group of atoms such as carbon, nitrogen, oxygen, silicon, phosphorus and/or sulfur, preferably carbon, nitrogen, oxygen and/or sulfur, more preferably carbon, nitrogen and/or oxygen, and further preferably carbon and/or nitrogen. $Q^1$ formed from this group of atoms may be saturated or unsaturated, and when it is substitutable, $Q^1$ may have a substituent. Examples of the substituent include the groups explained in the above section concerning Z.

In Formula (2), examples of the group having a ring structure to be bound to W (a group having a ring structure including $Q^1$ and an aryl group having $R^2$ to $R^5$) include a group having a ring structure represented by one of the following formulae (i) to (vi) that may have a substituent (in the formulae, * represents a site to be bound to W). Among these, a group having a ring structure represented by formula (i), (ii) or (iii) that may have a substituent is preferred, and a group having a ring structure represented by formula (i) that may have a substituent is more preferred.

(i)
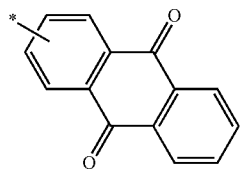

(ii)
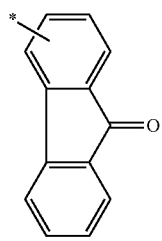

(iii)
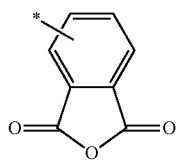

(iv)
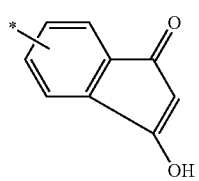

(v)
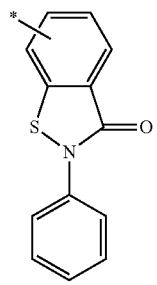

(vi)
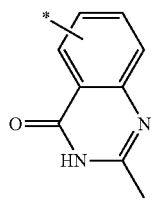

The structural unit (repeating unit) represented by Formula (2) is preferably represented by the following Formula (3).

Formula (3)
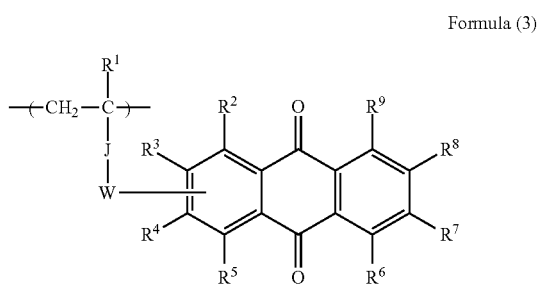

In Formula (3), $R^6$ to $R^9$ each independently represent a hydrogen atom or a substituent. $R^1$ to $R^5$, J and W have the same definitions as $R^1$ to $R^5$, J and W in Formula (2), and the preferred ranges thereof are also the same.

When $R^6$ to $R^9$ represent a substituent, examples of the substituent include the groups explained in the section concerning Z. $R^6$ to $R^9$ are preferably a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxyl group, a halogen atom, a cyano group, a carboxyl group, a nitro group or a heterocyclic group, more preferably a hydrogen atom, an alkyl group, an aryl group, an amino group, an alkoxy group, an aryloxy group, an acyl group, an acylamino group, a sulfonylamino group, a carbamoyl group, a sulfonyl group, a hydroxyl group, a halogen atom or a cyano group, more preferably a hydrogen atom, an acyl group, a hydroxyl group, a halogen atom or a cyano group, and particularly preferably a hydrogen atom.

The repeating unit represented by Formula (3) is preferably the following combination of substituents (a), (b), (c) or (d), more preferably the combination of (b), (c) or (d), further preferably the combination of (c) or (d), and particularly preferably the combination (d). In the following, *-represents a bond to be bound to the main chain.

(a) J represents *—CO—, *—CONR¹⁰—, a phenylene group or *—C₆H₄CO—, R¹⁰ represents a hydrogen atom, an alkyl group or an aryl group. W represents a single bond, an imino group, an alkylene group or an arylene group. R¹ represents a hydrogen atom, an alkyl group or an aryl group. R² to R⁵ each independently represent a single bond, a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxyl group, a halogen atom, a cyano group, carboxyl group, a nitro group or a heterocyclic group. One of R² to R⁵ is a single bond to be bound to W. R⁶ to R⁹ each independently represent a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxyl group, a halogen atom, a cyano group, a carboxyl group, a nitro group or a heterocyclic group.

(b) J represents *—C₆H₄CO—, *—CONR¹⁰— or a phenylene group. R¹⁰ represents a hydrogen atom or an alkyl group. W represents an imino group, a single bond or an arylene group. R¹ represents a hydrogen atom or an aryl group. R² to R⁵ each independently represent a hydrogen atom, an alkyl group, an aryl group, an amino group, an alkoxy group, an aryloxy group, an acyl group, an acylamino group, a sulfonylamino group, a carbamoyl group, a sulfonyl group, a hydroxyl group, a halogen atom or a cyano group. One of R² to R⁵ is a single bond to be bound to W. R⁶ to R⁹ each independently represent a hydrogen atom, an alkyl group, an aryl group, an amino group, an alkoxy group, an aryloxy group, an acyl group, an acylamino group, a sulfonylamino group, a carbamoyl group, a sulfonyl group, a hydroxyl group, a halogen atom or a cyano group.

(c) J represents *—C₆H₄CO— or *—CONR¹⁰—. R¹⁰ represents a hydrogen atom. W represents an imino group or a single bond. R¹ represents a hydrogen atom or an aryl group. R² to R⁵ each independently represent a hydrogen atom, an acyl group, a hydroxyl group, a halogen atom or a cyano group. One of R² to R⁵ is a single bond to be bound to W. R⁶ to R⁹ each independently represent a hydrogen atom, an acyl group, a hydroxyl group, a halogen atom or a cyano group.

(d) J represents *—C₆H₄CO—. W represents an imino group. R¹ represents a hydrogen atom or an aryl group. R² to R⁵ each independently represent a hydrogen atom, an acyl group, a hydroxyl group, a halogen atom or a cyano group. One of R² to R⁵ is a single bond to be bound to W. R⁶ to R⁹ each independently represent a hydrogen atom.

The following are specific examples of the repeating unit represented by Formula (1), but the invention is not limited to these examples.

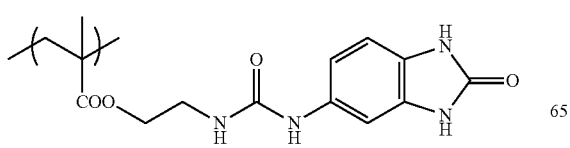

M-1

-continued

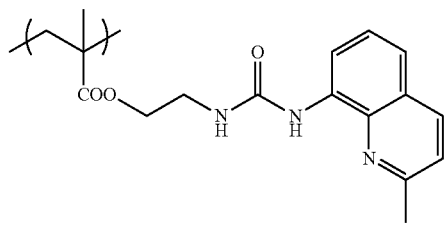

M-2

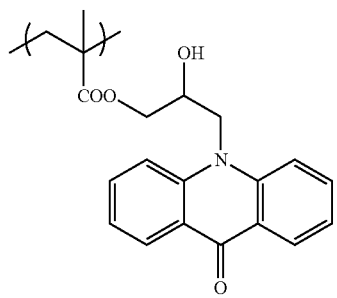

M-3

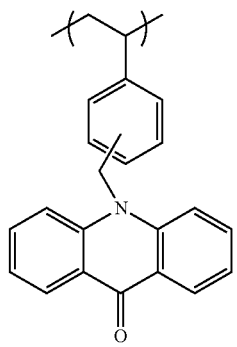

M-4

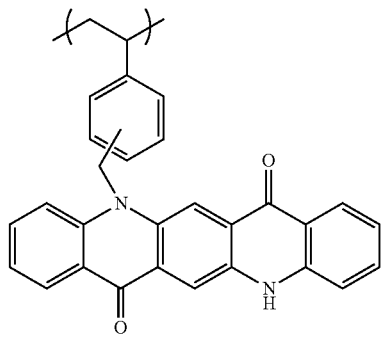

M-5

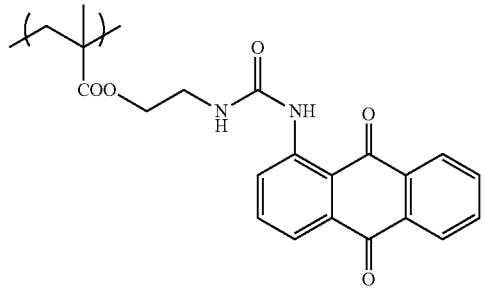

M-6

M-7
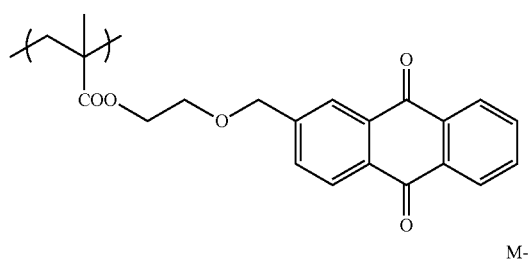
M-8
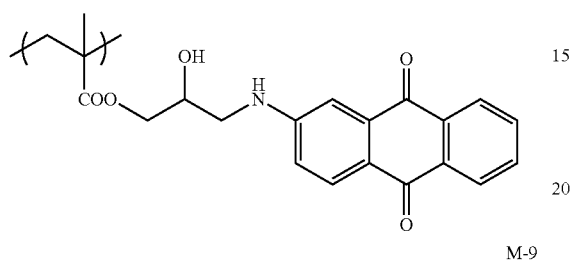
M-9
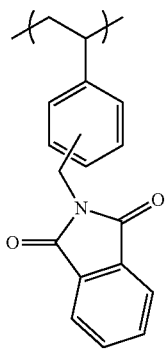
M-10
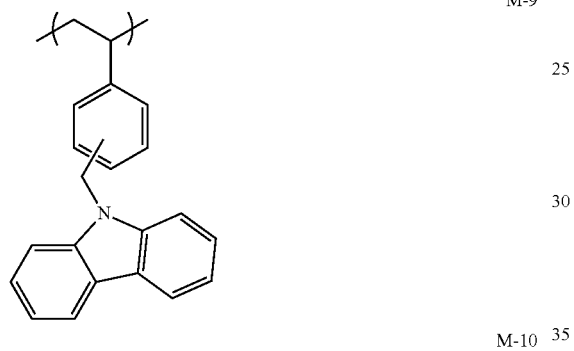
M-11
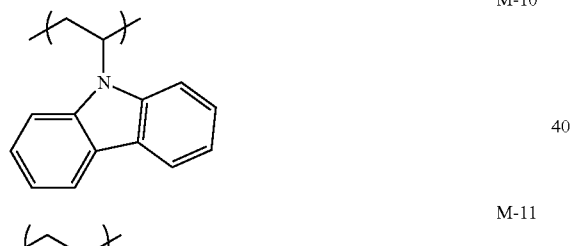
M-12
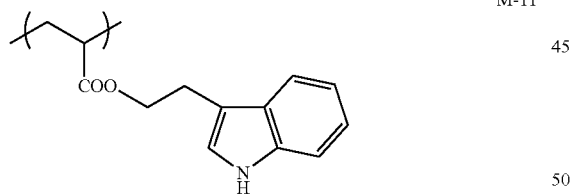
M-13
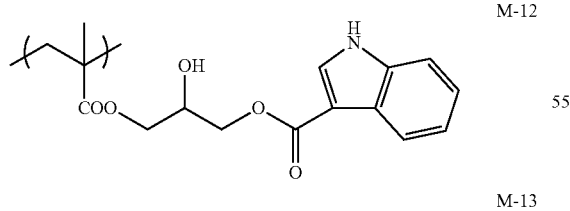
M-14
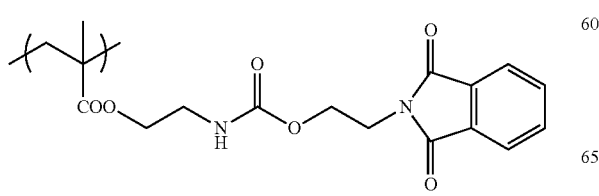
M-15
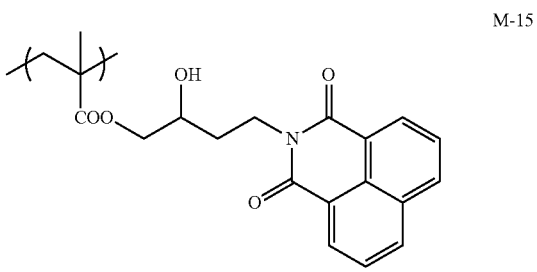
M-16
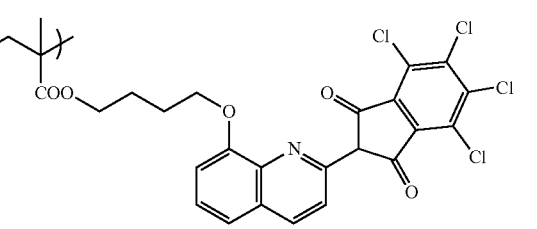
M-17
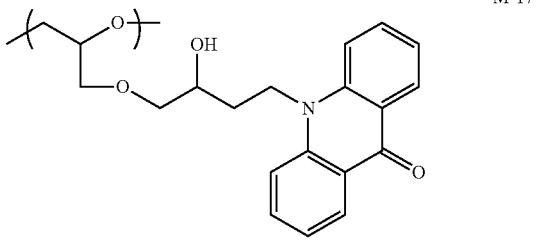
The following are specific examples of the repeating unit represented by Formula (2), but the invention is not limited to these examples.
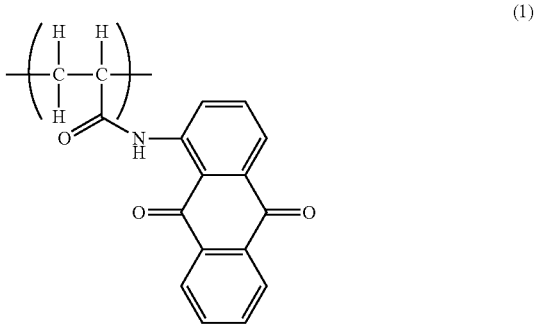
(1)

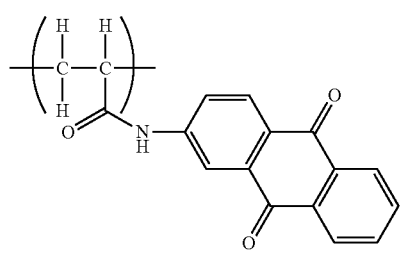
(2)
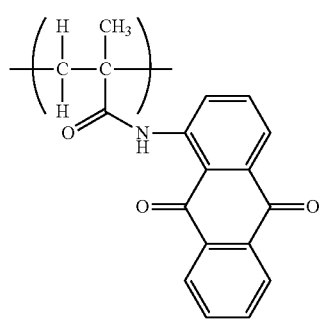
(3)
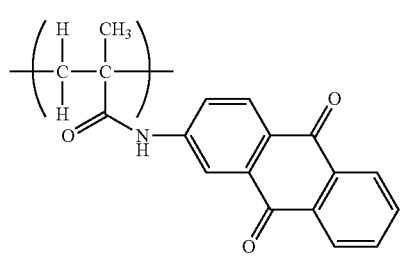
(4)
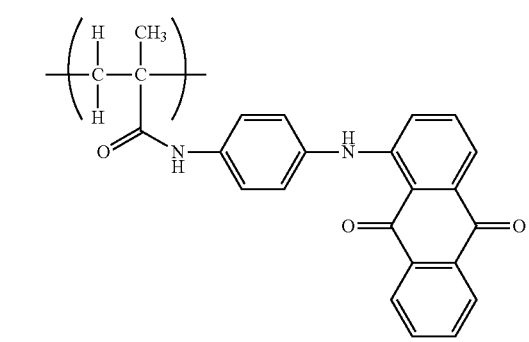
(5)
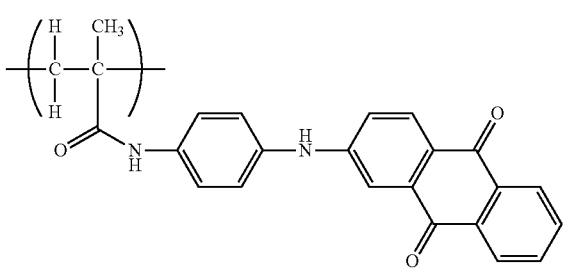
(6)
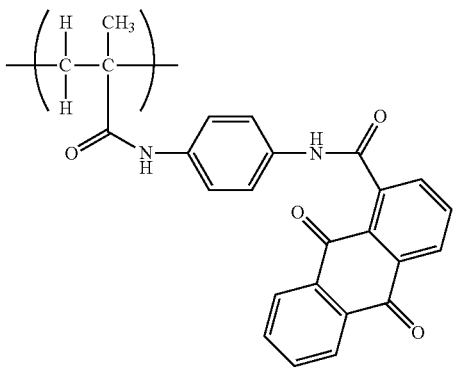
(7)
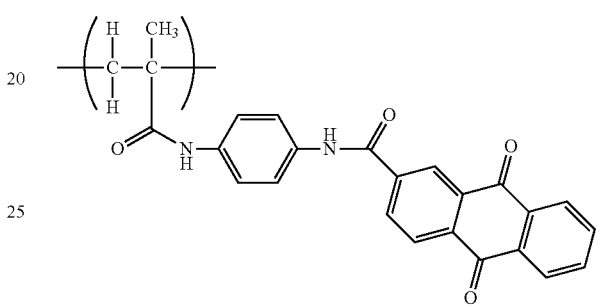
(8)
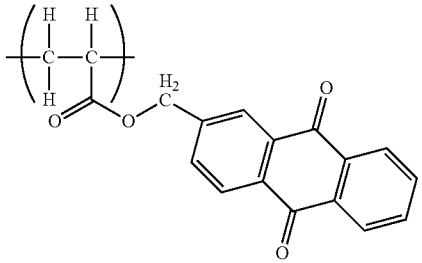
(9)
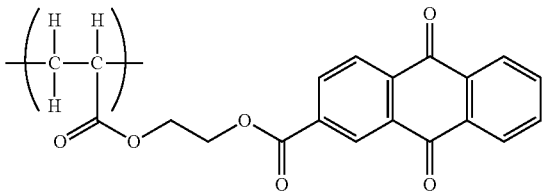
(10)
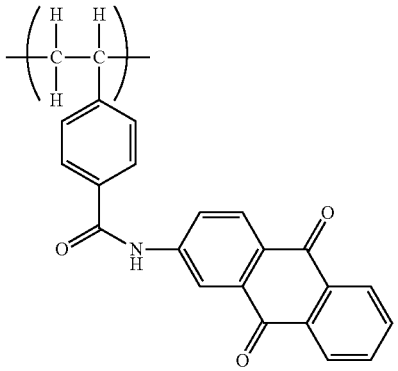
(11)

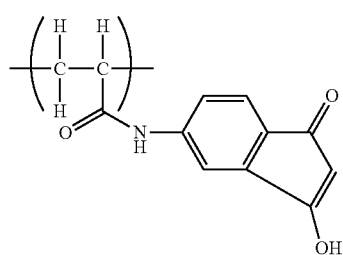
(12)
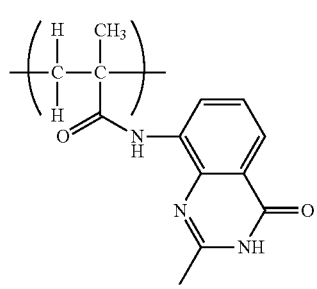
(13)
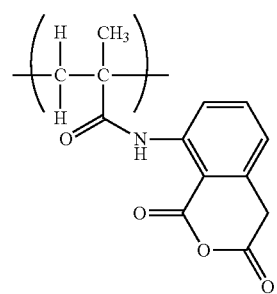
(14)
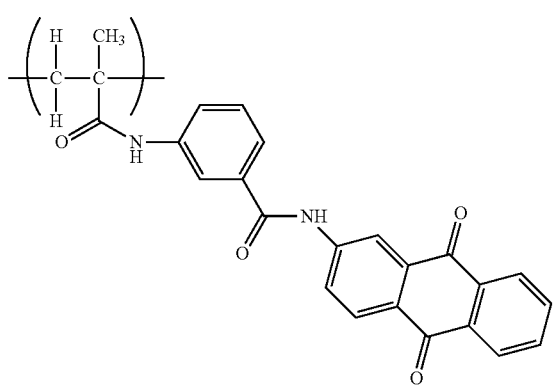
(15)
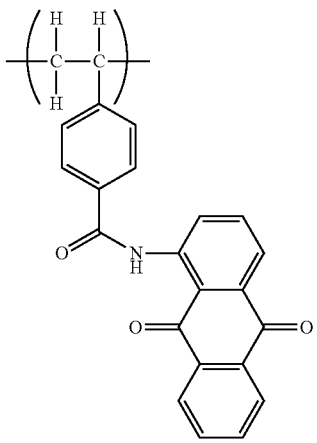
(16)
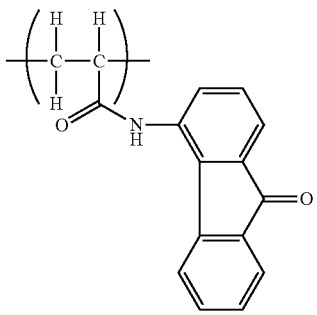
(17)
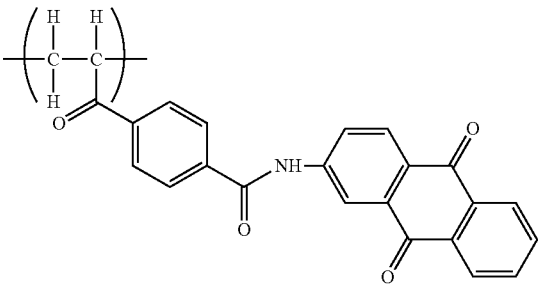
(18)
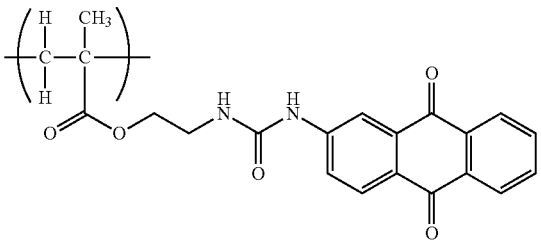
(19)
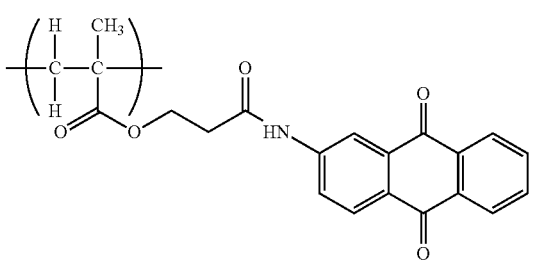
(20)

Component (c) is preferably a monomer including an aromatic ring or a monomer that can form a repeating unit that includes a heterocycle when used as the water-insoluble polymer or used as the aromatic ring-containing monomer, from the viewpoint of improving dispersibility of the colorant (in particular, a pigment) and reducing the amount of free polymer. In particular, when used in the ink composition according to the invention, component (c) is preferably a monomer component that can form a repeating unit that includes a heterocycle when used as the water-insoluble polymer (hereinafter, referred to as c-1), from the viewpoint of improving dispersibility of the colorant (in particular, a pigment), reducing the amount of free polymer, and the like.

The content of component (c-1) in component (c) is preferably from 10 to 100% by mass, and more preferably from 20 to 80% by mass, with respect to the total mass of component (c), from the viewpoint of reducing the amount of free polymer, and improving print density, abrasion resistance or the like.

The aromatic ring-containing monomer is preferably a styrene monomer component (hereinafter, referred to as c-2), and further preferably a styrene or a 2-methyl styrene. The content of component (c-2) in component (c) is preferably from 10 to 100% by mass, and more preferably from 20 to 80% by mass, with respect to the total mass of component (c), from the viewpoint improving print density, abrasion resistance or the like.

Further, from the viewpoint of improving dispersibility of the colorant or the like, component (c) is preferably an aromatic ring-containing monomer, and more preferably an aryl ester of (meth)acrylic acid (hereinafter, referred to as c-3) among the aromatic ring-containing monomers. Component (c-3) is preferably a (meth)acrylate having an aryl alkyl group having 7 to 22 carbon atoms, more preferably 7 to 18 carbon atoms, further more preferably 7 to 12 carbon atoms, or a (meth)acrylate having an aryl group having 6 to 22 carbon atoms, more preferably 6 to 18 carbon atoms, further more preferably 6 to 12 carbon atoms. Specifically, preferred examples of these monomers include benzyl (meth)acrylate and phenoxyethyl (meth)acrylate. The content of component (c-3) in component (c) is preferably from 10 to 100% by mass, and more preferably from 20 to 80% by mass, with respect to the total mass of component (c), from the viewpoint of dispersibility of the colorant, or the like.

Component (c) may be used alone or in combination of two or more kinds, and it is also preferred to combine component (c-1) and component (c-2); component (c-2) and component (c-3); or component (c-1) and component (c-3). From the viewpoint of reducing the amount of free polymer, it is more preferred to combine component (c-1) and component (c-2), or component (c-2) and component (c-3), and it is most preferred to combine component (c-1) and component (c-2).

In the invention, it is preferable that the monomer mixture that includes each of components (a), (b) and (c) further includes (d), which is a hydroxyl group-containing monomer (hereinafter, also referred to as component (d)).

Component (d) has a function of enhancing dispersion stability. Examples of component (d) include 2-hydroxyethyl (meth)acrylate, 3-hydroxypropyl (meth)acrylate, polyethyleneglycol (n=2-30, n represents an average addition mole number of oxyalkylene group, hereinafter the same), (meth)acrylate, polypropyleneglycol (n=2-30) (meth)acrylate, and poly (ethyleneglycol (n=1-15).propyleneglycol (n=1-15)) (meth)acrylate. Among these, 2-hydroxyethyl (meth)acrylate, polyethyleneglycol monomethacrylate and polypropyleneglycol methacrylate are preferred.

The monomer mixture may further include (e) which is a monomer represented by the following Formula (3) (hereinafter, also referred to as component (e)).

$$CH_2=C(R^3)COO(R^4O)_pR^5 \qquad \text{Formula (3)}$$

In Formula (3), $R^3$ represents a hydrogen atom or an alkyl group having 1 to 5 carbon atoms, $R^4$ represents a divalent hydrocarbon group having 1 to 30 carbon atoms that may have a hetero atom, $R^5$ represents a monovalent hydrocarbon group having 1 to 30 carbon atoms that may have a hetero atom, and p represents an average addition mole number of from 1 to 60, and preferably 1 to 30.

Component (e) exhibits excellent effects such as improving jetting stability of the ink composition, suppressing occurrence of ink-misdirection even during continuous printing, and the like.

In Formula (3), the hetero atom that $R^4$ or $R^5$ may have each independently is, for example, a nitrogen atom, an oxygen atom, a halogen atom or a sulfur atom.

Representative examples of the group represented by $R^4$ include an aromatic group having 6 to 30 carbon atoms, a heterocyclic group having 3 to 30 carbon atoms and an alkylene group having 1 to 30 carbon atoms, and these groups may have a substituent. Representative examples of the group represented by $R^5$ include an aromatic group having 6 to 30 carbon atoms and a heterocyclic group having 3 to 30 carbon atoms, and these groups may have a substituent. $R^4$ and $R^5$ may be a combination of two or more kinds of groups. Examples of the substituent include an aromatic group, a heterocyclic group, an alkyl group, a halogen atom and an amino group.

Preferred examples of $R^4$ include a phenylene group that may have a substituent having 1 to 24 carbon atoms, an aliphatic alkylene group having 1 to 30 carbon atoms, preferably 1 to 20 carbon atoms, an alkylene group having 7 to 30 carbon atoms and having an aromatic ring, and an alkylene group having 4 to 30 carbon atoms and having a heterocycle. Particularly preferred specific examples of $R^4O$ group include an oxyethylene group, an oxy(iso)propylene group, an oxytetramethylene group, an oxyheptamethylene group, an oxyhexamethylene group, an oxyalkylene group having 2 to 7 carbon atoms formed from one or more of these oxyalkylene groups, and an oxyphenylene group.

Preferred examples of $R^5$ include a phenyl group, an aliphatic alkyl group having 1 to 30 carbon atoms, preferably an aliphatic alkyl group having 1 to 20 carbon atoms that may have a branched chain, an alkyl group having 7 to 30 carbon atoms having an aromatic ring, and an alkyl group having 4 to 30 carbon atoms having a heterocycle. More preferred examples of $R^5$ include an alkyl group having 1 to 12 carbon atoms such as a methyl group, an ethyl group, an (iso)propyl group, an (iso)butyl group, an (iso)pentyl group or an (iso)hexyl group, and a phenyl group.

Specific examples of component (e) include methoxypolyethyleneglycol (p in Formula (3) is 1 to 30) (meth)acrylate, methoxypolytetramethyleneglycol (p=1 to 30) (meth)acrylate, ethoxypolyethyleneglycol (p=1 to 30) (meth)acrylate, (iso)propoxypolyethyleneglycol (p=1 to 30) (meth)acrylate, butoxypolyethyleneglycol (p=1 to 30) (meth)acrylate, octoxypolyethyleneglycol (p=1 to 30) (meth)acrylate, methoxypolypropyleneglycol (p=1 to 30) (meth)acrylate, and methoxy(ethyleneglycol.propyleneglycol copolymer) (p=1 to 30, among which the ethylene glycol portion is 1 to 29) (meth)acrylate. Among these, methoxypolyethyleneglycol (p=1 to 30) (meth)acrylate is preferred.

Specific examples of commercially available components (d) and (e) include polyfunctional acrylate monomers (NK ESTER) M-40G, 90G and 230G (trade name, available from Shin-Nakamura Chemical Co., Ltd.); and BLEMMER series, PE-90, 200 and 350, PME-100, 200, 400 and 1000, PP-1000, PP-500, PP-800, AP-150, AP-400, AP-550, AP-800, 50PEP-300, 50POEP-800B and 43PAPE-600B, trade name, available from NOF Corporation.

Components (a) to (e) may be used alone or in combination of two or more kinds, respectively.

The contents of components (a) to (e) in the monomer mixture are as follows.

The content of component (a) is preferably from 1 to 50% by mass, more preferably from 2 to 40% by mass, and particularly preferably from 3 to 20% by mass, from the viewpoint of dispersion stability of the obtained water-insoluble polymer particles including a colorant (in particular, a pigment), or the like.

The content of component (b) is preferably from 1 to 50% by mass, and more preferably from 5 to 40% by mass, from the viewpoint of dispersion stability of the water-insoluble polymer particles including a colorant (in particular, a pigment), or the like.

The content of component (c) is preferably from 5 to 98% by mass, and more preferably from 10 to 60% by mass, from the viewpoint of dispersion stability of the water-insoluble polymer particles including a colorant (in particular, a pigment), or the like.

The mass ratio of the content of component (a) to the total content of component (b) and component (c) ((a)/[(b)+(c)]) is preferably from 0.01 to 1, more preferably from 0.02 to 0.67, and further preferably from 0.03 to 0.50, from the viewpoint of jetting ability of the obtained ink composition, or the like.

The content of component (d) is preferably from 5 to 40% by mass, and more preferably from 7 to 30% by mass, from the viewpoint of jetting ability and dispersion stability, or the like.

The content of component (e) is preferably from 5 to 50% by mass, and more preferably from 10 to 40% by mass, from the viewpoint of jetting ability and dispersion stability, or the like.

The total content of component (a) and component (d) is preferably from 6 to 60% by mass, and more preferably from 10 to 50% by mass, from the viewpoint of dispersion stability in water, or the like.

The total content of component (a) and component (e) is preferably from 6 to 75% by mass, more preferably from 13 to 50% by mass, from the viewpoint of dispersion stability in water, jetting ability, or the like.

The total content of component (a), component (d) and component (e) is preferably from 6 to 60% by mass, more preferably from 7 to 50% by mass, from the viewpoint of dispersion stability in water and jetting ability.

(Production of Water-Insoluble Polymer)

The water-insoluble polymer that forms the water-insoluble polymer particles according to the invention may be produced by copolymerizing the aforementioned monomer mixture by a known polymerization method, such as a mass polymerization method, a solution polymerization method, a suspension polymerization method or an emulsion polymerization method. Among these polymerization methods, when the polymerization is performed by a solution polymerization method, effects of the invention, especially pigment dispersibility or the like, may be suitably obtained.

The solvent used in the solution polymerization method is preferably a polar organic solvent having high compatibility with a water-insoluble polymer. Examples of the polar organic solvents include aliphatic alcohols such as butoxy ethanol; aromatic compounds such as toluene or xylene; ketones such as methyl ethyl ketone and methyl isobutyl ketone; esters such as ethyl acetate; dimethyl sulfoxide, dimethyl formamide, and N-methyl-2-pyrrolidone. A mixed solvent of water and one or more kinds of these solvents is preferably used.

A known radical polymerization initiator may be used when polymerization is performed, and examples thereof include an azo compound such as 2,2'-azobis(isobutyronitrile) or 2,2'-azobis(2,4-dimethylvaleronitrile and an organic peroxide such as tert-butylperoxyoctoate or dibenzoyloxide. The amount of radical polymerization initiator is preferably from 0.01 to 5 mol, more preferably from 0.01 to 2 mol, with respect to 1 mol of the monomer mixture. Further, a known polymerization chain transfer agent may be added during polymerization, and examples thereof include mercaptans such as octylmercaptan or 2-mercaptoethanol, and thiuram disulfides.

The conditions for polymerization of the monomer mixture may differ depending on the type of radical polymerization initiator, monomer, solvent or the like to be used. However, typically, the polymerization temperature is preferably from 30 to 100° C., and more preferably from 50 to 80° C., while the polymerization time is preferably from 1 to 20 hours. The atmosphere for polymerization is preferably a nitrogen gas atmosphere or an inert gas, such as argon, atmosphere.

After the completion of polymerization reaction, the produced polymer may be isolated from the reaction solution by a known method such as reprecipitation, solvent distillation, or the like. Further, the obtained polymer may be purified by removing unreacted monomers or the like by repeating reprecipitation, or by performing membrane separation, chromatography, extraction or the like.

The weight average molecular weight of the obtained polymer is preferably from 5,000 to 500,000, more preferably from 10,000 to 400,000, and particularly preferably from 10,000 to 300,000, from the viewpoint of dispersion stability of the pigment, water resistance, jetting ability or the like. The weight average molecular weight of the polymer may be measured by a method described in the examples.

The solid content of the water-insoluble polymer solution is preferably from 3 to 30% by mass, more preferably from 5 to 20% by mass, particularly preferably from 10 to 15% by mass.

When the water-insoluble polymer has a salt-forming group derived from the monomer having a salt-forming group (a), the polymer is neutralized with a neutralizer when used. An acid or a base may be used as the neutralizer depending on the kind of a salt-forming group in the water-insoluble polymer. Examples of the neutralizers include acids such as hydrochloric acid, acetic acid, propionic acid, phosphoric acid, sulfuric acid, lactic acid, succinic acid, glycolic acid, gluconic acid or glyceric acid, and bases such as lithium hydroxide, sodium hydroxide, potassium hydroxide, ammonia, methylamine, dimethylamine, trimethylamine, ethylamine, diethylamine, triethylamine, triethanolamine, tributylamine, tetramethylammonium hydroxide, benzyltrimethylammonium hydroxide, choline hydroxide or tetrabutylammonium hydroxide.

The degree of neutralization of the water-insoluble polymer is preferably from 10 to 200%, more preferably from 20 to 150%, and particularly preferably from 50 to 150%.

When the salt-forming group is an anionic group, the degree of neutralization may be calculated by the following formula.

$$\{[\text{mass of neutralizer (g)/equivalent amount of neutralizer}]/[\text{acid value of polymer (KOHmg/g)} \times \text{mass of polymer (g)}/(56 \times 1000)]\} \times 100$$

When the salt-forming group is a cationic group, the degree of neutralization may be calculated by the following formula.

$$\{[\text{mass of neutralizer (g)/equivalent amount of neutralizer}]/[\text{amine value of polymer (HCLmg/g)} \times \text{mass of polymer (g)}/(36.5\times1000)]\}\times100$$

The acid value or the amine value may be obtained by calculating from the structural unit of the water-insoluble vinyl polymer, or may be obtained by dissolving the polymer in a suitable solvent (such as methyl ethyl ketone) and performing titration.

Colorant

The colorant in the ink composition according to the invention is included in the aforementioned water-insoluble polymer (the colorant is coated with the water-insoluble polymer) that functions as a dispersant.

The colorant used in the invention is not particularly limited, and examples thereof include pigments, hydrophobic dyes (such as oil-soluble dyes or disperse dyes), and water-soluble dyes (such as acid dyes, reactive dyes or direct dyes). From the viewpoint of water resistance, storage stability and abrasion resistance, a pigment and a hydrophobic dye are preferred. In particular, in view of achieving high weather resistance, which is an increasingly desired property in these days, a pigment is preferably used.

When used in the ink composition, the pigment or the hydrophobic dye needs to be formed into particles that are stable in the ink, with the use of a surfactant or a polymer. In particular, from the viewpoint of dispersibility or the like, it is preferred to include the pigment and/or the hydrophobic dye in polymer particles.

The pigment may be either an inorganic pigment or an organic pigment. If necessary, these pigments may be used in combination with an extender pigment.

(Pigment)

In the ink composition according to the invention, the pigment is preferably included in the water-insoluble polymer particles (the pigment is preferably coated with the water-insoluble polymer) from the viewpoint of dispersion stability, jetting stability or the like.

The pigment may be either an inorganic pigment or an organic pigment. If necessary, these pigments may be used in combination with an extender pigment.

Examples of the inorganic pigment include carbon black, metal oxides, metal sulfides and metal chlorides. Among these, particularly in black aqueous inks, carbon black is preferred. Examples of the carbon black include furnace black, thermal lamp black, acetylene black and channel black.

Examples of the organic pigment include azo pigments, disazo pigments, phthalocyanine pigments, quinacridone pigments, isoindolinone pigments, dioxazine pigments, perylene pigments, perinone pigments, thioindigo pigments, anthraquinone pigments and quinophthalone pigments.

The color hue of the organic pigment is not particularly limited, and those having a chromatic color such as red organic pigments, yellow organic pigments, blue organic pigments, orange organic pigments and green organic pigments.

Specific examples of preferred organic pigments include products with the following product numbers: C. I. Pigment Yellow 13, 17, 74, 83, 97, 109, 110, 120, 128, 139, 151, 154, 155, 174 and 180; C. I. Pigment Red 48, 57:1, 122, 146, 176, 184, 185, 188 and 202; C. I. Pigment Violet 19 and 23; C. I. Pigment Blue 15, 15:1, 15:2, 15:3, 15:4, 16 and 60; and C. I. Pigment Green 7 and 36.

Examples of the extender pigments include silica, calcium carbonate and talc.

The hydrophobic dye is not particularly limited as long as it can be included in cross-linked polymer particles. The oil-soluble dye that dissolves in an organic solvent used for the production of polymer (preferably methyl ethyl ketone) in an amount of 2 g/L or more, and preferably from 20 to 500 g/L (25° C.) with respect to the organic solvent, is preferably used from the viewpoint of efficiently including the dye in the polymer.

Examples of the hydrophobic dyes include oil-soluble dyes and disperse dyes, among which oil-soluble dyes are preferred.

Examples of the oil-soluble dyes include products with the following product numbers: C. I. Solvent Black, C. I. Solvent Yellow, C. I. Solvent Red, C. I. Solvent Violet, C. I. Solvent Blue, C. I. Solvent Green and C. I. Solvent Orange. These products are available from Orient Chemical Industries, Co., Ltd., BASF Japan Ltd., and the like.

Examples of the disperse dyes include products with the following product numbers: C. I. Disperse Yellow, C. I. Disperse Orange, C. I. Disperse Red, C. I. Disperse Violet, C. I. Disperse Blue and C. I. Disperse Green. Among these, preferred yellow dyes are C. I. Solvent Yellow 29 and 30, preferred cyan dye is C. I. Solvent Blue 70, preferred magenta dyes are C. I. Solvent Red 18 and 49, and preferred black dyes are C. I. Solvent Black 3 and 7, and nigrosine black dyes.

These colorants may be used alone or in combination of two or more kinds thereof.

The mass ratio of the colorant and the water-insoluble polymer (water-insoluble polymer /colorant) is preferably from 10/90 to 90/10, more preferably from 20/80 to 80/20, and particularly preferably from 20/80 to 50/50, from the viewpoint of glossiness and storage stability.

In the ink composition according to the invention, from the viewpoint of improving print density and dispersion stability, and the like, the mass ratio of the colorant (in particular, a pigment) to the water-insoluble polymer (colorant/water-insoluble polymer) is preferably from 50/50 to 90/10, and more preferably from 50/50 to 80/20, in terms of calculated values based on the contents.

Further, from the viewpoint of reducing the amount of solid content as much as possible, as well as improving print density and dispersion stability, the mass ratio of the polymer that directly contributes to dispersion of the colorant in the ink composition by adsorbing to the colorant (hereinafter, also referred to as "polymer adsorbed colorant" or simply referred to as "adsorbing polymer") with respect to the colorant (adsorbing polymer/colorant) is preferably from 0.1 to 0.75, more preferably from 0.1 to 0.55, further preferably from 0.15 to 0.55, and particularly preferably from 0.15 to 0.45. The amount of adsorbing polymer is, as described in the examples, a value of subtracting the amount of free polymer from the amount of water-insoluble polymer in the ink composition.

(Wetting Agent)

The ink composition according to the invention includes at least one selected from the group consisting of urea, a urea derivative, a pyrrolidone derivative, an alkyl glycine represented by the following Formula 1, glycyl betaine, and sugars. The wetting agent is preferably a solid wetting agent.

In the invention, the wetting agent refers to a water-soluble compound that has a water-retaining function and is in the form of a solid at 25° C.

Examples of the urea derivative include a compound obtained by substituting a hydrogen atom on the nitrogen of urea with an alkyl group or an alkanol; thiourea; and a compound obtained by substituting a hydrogen atom on the nitrogen of thiourea with an alkyl group or an alkanol. Specific examples of these compounds include N-methyl urea, N,N-dimethyl urea, thiourea, ethylene urea, hydroxyethyl urea, hydroxybutyl urea, ethylene thiourea and diethyl thiourea.

Examples of the pyrrolidone derivative include a compound obtained by substituting a hydrogen atom on the nitrogen of pyrrolidone with an alkyl group or an alkanol, and specific examples thereof include 2-methylpyrrolidone, N-methylpyrrolidone, N-octyl pyrrolidone, N-lauryl pyrrolidone and β-hydroxyethyl pyrrolidone.

In the alkyl glycine represented by Formula A: $R_1R_2NCH_2COOM$, $R_1$ and $R_2$ each independently represent a linear or branched alkyl group having 1 to 5 carbon atoms, and M represents a hydrogen atom, an alkali metal atom or an alkaline earth metal atom.

Examples of the alkyl glycine include N-methyl glycine, N,N-dimethyl glycine, N,N,N-trimethyl glycine, N-ethyl-N-methyl glycine, N,N-diethyl glycine, N-isopropyl-N-methyl glycine, N-isopropyl-N-ethyl glycine, N,N-diisopropyl glycine, N,N-dibutyl glycine, N-butyl-N-methyl glycine and N-butyl-N-ethyl glycine. Among these compounds, N,N,N-trimethyl glycine is preferred in view of suppressed amount of bubbles formed in the ink, high jetting stability and excellent maintenance suitability.

Examples of the sugars include monosaccharides, disaccharides, oligosaccharides (including trisaccharides and tetrasaccharides) and polysaccharides, and specific examples thereof include glucose, mannose, fructose, ribose, xylose, arabinose, galactose, aldonic acid, glucitol (sorbit), maltose, cellobiose, lactose, sucrose, trehalose and maltotriose. In the present specification, the polysaccharide refers to a sugar in a broad sense, and includes substances that exist widely in nature such as alginic acid, a-cyclodextrin or cellulose.

Further, derivatives of these sugars include reduction sugars of the above sugars (such as sugar alcohols) and sugar acids (such as aldonic acid, uronic acid, amino acid or thio sugars). Among these, sugar alsohols are preferred, and maltitol, sorbitol and xylitol are more preferred.

A hyaluronic acid salt commercially-available in the form of 1% aqueous solution of sodium hyaluronate (molecular weight: 350,000) may be used.

Since urea, urea derivatives, pyrrolidone derivatives and sugars exhibit a high hydrogen bonding ability, these compounds are highly effective in preventing ink from drying. Moreover, by using these compounds, even when the ink containing highly hydrophobic polymer particles such as the water-insoluble polymer according to the invention is adhering to nozzles, cleaning and removal of the ink may be easily performed. The reason for this is not clear; however, it is presumed that interaction between the salt-forming group of the water-insoluble polymer and the above compound via hydrogen bond helps redispersion of the solidified ink. It is also presumed that interaction between the salt-forming group of the water-insoluble polymer and the above compound via hydrogen bond contributes to suppressing the formation of bubbles in the ink.

Further, when the alkyl glycine represented by Formula 1 or glycyl betaine is used, it is also possible to easily perform cleaning or removal of ink adhering to nozzles, even when the ink contains highly hydrophobic polymer particles such as the water-insoluble polymer according to the invention. The reason for this is presumed that the above compound suppresses the water-insoluble polymer from adhering to nozzle members as a result of salting out during drying and condensation of the ink, thereby causing aggregating of the water-insoluble polymer particles.

Among the above, from the viewpoint of achieving high water-retaining ability and ease of removing ink residue, the wetting agent is preferably at least one selected from urea, a urea derivative, an alkyl glycine represented by Formula A, glycyl betaine, maltitol, sorbitol or xylitol; and more preferably at least one selected from urea or a urea derivative.

In particular, urea and a urea derivative are suitably used since these compounds have a high hydrotropic ability, and therefore these compounds have a function as an aid for improving the cleanability (redispersibility) of the water-insoluble polymer.

The content of the wetting agent in the ink composition according to the invention is preferably from 5 to 30% by mass, more preferably from 5 to 20% by mass, and particularly preferably from 5 to 10% by mass, with respect to the total mass of the ink, from the viewpoint of removability (cleanability) of ink residue.

In the invention, the content ratio of the wetting agent with respect to the total mass of the water-insoluble polymer and the colorant in the ink composition (mass of wetting agent/(mass of water-insoluble polymer+mass of colorant) is preferably 0.01 or higher, more preferably from 0.1 to 3.0, and particularly preferably from 0.5 to 2.0.

(Method of Producing Ink Composition)

The method of producing the ink composition according to the invention is not particularly limited, and preferred examples thereof include a method of performing the following processes (1) to (4), and a method of including a water-insoluble polymer in at least one of a solution in which a colorant is dissolved or an aqueous medium, and then contacting the solution and the aqueous medium so as to allow colorant particles to precipitate (hereinafter, also referred to as "build-up method").

Process (1): subjecting a mixture containing the water-insoluble polymer, organic solvent, pigment and water to a dispersion treatment Process (2): removing the organic solvent, thereby obtaining a pigment aqueous dispersion of water-insoluble polymer particles containing the pigment Process (3): subjecting the pigment aqueous dispersion obtained in process (2) to centrifugal separation, thereby obtaining a precipitation Process (4): redispersing the precipitation obtained in process (3) in an aqueous medium It is possible to obtain a pigment aqueous dispersion of water-insoluble polymer particles containing the pigment through processes (1) and (2). However, it is preferred to perform process (3) from the viewpoint of improving stability in continuous discharge, discharge reliability such as an ability to recover discharge after pausing, and cleanability, as well as reducing the amount of free polymer; and it is more preferred to perform process (4) from the viewpoint of reducing the amount of solid content, and improving discharge reliability and cleanability.

In the present specification, "aqueous dispersion of water-insoluble polymer particles containing pigment" refers to a dispersion in which water-insoluble polymer particles containing a pigment are dispersed in a medium containing water as a main component.

<Process (1)>

In process (1), it is preferred to obtain an oil-in-water dispersion by a method including dissolving the water-insoluble polymer in an organic solvent, subsequently adding thereto a pigment, water and optionally a neutralizer, a surfactant or the like, and mixing the same.

In this mixture, the amount of pigment is preferably from 5 to 50% by mass, more preferably from 10 to 40% by mass; the amount of organic solvent is preferably from 10 to 70% by mass, more preferably from 10 to 50% by mass; the amount of water-insoluble polymer is preferably from 2 to 40% by mass, more preferably from 3 to 20% by mass; and the amount of water is preferably from 10 to 70% by mass, more preferably from 20 to 70% by mass.

When the water-insoluble polymer has a salt-forming group, a neutralizer is preferably used. The degree of neutralization when using the neutralizer for neutralization is not particularly limited. Typically, the finally obtained aqueous dispersion is preferably neutral, for example, with a pH of from 4.5 to 10. It is also possible to determine the pH according to the desired degree of neutralization of the water-insoluble polymer. Examples of the neutralizer include the aforementioned examples. The water-insoluble polymer may be neutralized in advance.

Examples of the organic solvent include alcohol solvents such as ethanol, isopropanol and isobutanol; ketone solvents such as acetone, methyl ethyl ketone, methyl isobutyl ketone and diethyl ketone; and ether solvents such as dibutyl ether, tetrahydrofuran and dioxane. An organic solvent that dissolves in 100 g of water at 20° C. in an amount of 5 g or more is preferably used, more preferably 10 g or more, more specifically preferably from 5 to 80 g, and further preferably from 10 to 50 g. In particular, methyl ethyl ketone and methyl isobutyl ketone are preferred.

The method of dispersing the mixture in process (1) is not particularly limited. Although the average particle size of the water-insoluble polymer may be reduced to a desired particle size only during the main dispersion, the average particle size is preferably controlled to a desired particle size by performing preliminary dispersion, and then performing main dispersion while applying shear stress to the particles. The dispersion in process (1) is preferably performed at 5 to 50° C., more preferably at 10 to 35° C.

The preliminary dispersion of the mixture may be performed by using a commonly used mixing/stirring apparatus such as an anchor wing. Among these mixing/stirring apparatuses, a high-speed mixing/stirring apparatus such as ULTRADISPER (trade name, available from Asada Iron Works, Co., Ltd), EBARA MILDER (trade name, available from Ebara Corporation) and TK HOMOMIXER (trade name, available from Primix Corporation) are preferably used.

Examples of the means for applying shear stress during the main dispersion include a kneading machine such as a roll mill, a bead mill, a kneader or an extruder, a homovalve-type high-pressure homogenizer represented by a high-pressure homogenizer (trade name, available from Izumi Food Machinery Co., Ltd.) and MINILAB 8.3H (trade name, available from Rannie) and a chamber-type high-pressure homogenizer such as MICROFULIDIZER (trade name, available from Microfluidics) and NANOMIZER (trade name, available from Nanomizer Inc.) These apparatuses may be used in combination of two ore more kinds thereof. Among these apparatuses, a high-pressure homogenizer is preferred from the viewpoint of reducing the particle size of the pigment.

<Process (2)>

In process (2), an aqueous dispersion of water-insoluble polymer particles containing a pigment may be obtained by making the dispersion aqueous by distilling away the organic solvent from the obtained dispersion by a known process. The organic solvent in the obtained aqueous dispersion containing water-insoluble polymer particles is preferably substantially removed, but the organic solvent may remain in the dispersion as long as the object of the invention is not impaired. As necessary, the organic solvent may be further removed after performing the centrifugal separation in process (3). The amount of remaining organic solvent is preferably 0.1% by mass or less, more preferably 0.01% by mass or less, relative to the aqueous dispersion.

The obtained aqueous dispersion of water-insoluble polymer particles containing a pigment is formed from water as a main medium in which a solid component of water-insoluble polymer that contains a pigment is dispersed. The form of the water-insoluble polymer particles is not particularly limited as long as the particles are formed from the pigment and the water-insoluble polymer, and examples thereof include particles in which the pigment is encapsulated in the water-insoluble polymer, particles in which the pigment is uniformly dispersed in the water-insoluble polymer, and particles in which the pigment is exposed at the surface of polymer particles.

<Process (3)>

In process (3), the aqueous dispersion of water-insoluble polymer particles containing a pigment obtained in process (2) is subjected to centrifugal separation in order to separate the same to a supernatant liquid and a precipitation, and the precipitation is taken out. The aqueous dispersion of water-insoluble particles containing pigment, which is used as a starting material in process (3), it not limited to an aqueous dispersion obtained through processes (1) and (2), but may be an aqueous dispersion obtained by a common method such as acid precipitation.

In the aqueous dispersion that is used as a starting material in process (3), there are a polymer that is not adsorbed to the pigment, polymer particles that do not contain the pigment, a polymer that is adsorbed to the pigment but its adsorption force is weak, and therefore tend to be detached from the pigment due to a vehicle component in the ink (also collectively referred to as "free polymer"), and the like. By performing centrifugal separation, the amount of free polymer may be reduced. The free polymer is regarded as a cause of defective discharge or defective cleaning, as a result of adhering to nozzles to cause printing misdirection or streaks.

The centrifugal acceleration during the centrifugal separation in process (3) is preferably 2,000 G or higher, more preferably 3,000 G or higher, further preferably 4,000 G or higher, from the viewpoint of reducing the amount of polymer that tends to be free or the like, and from the same viewpoint, the centrifugal acceleration is preferably 150,000 G or less, more preferably 140,000 or less, further preferably 130,000 G or less. In view of the above, the centrifugal acceleration is preferably from 2,000 to 150,000 G, more preferably from 3,000 to 140,000 G, further preferably from 4,000 to 130,000 G.

In the present specification, the centrifugal acceleration is represented by a value obtained by dividing the following value a calculated from Formula (4) by gravitational acceleration (9.8 m/s$^2$).

$$a[m/s^2]/N^2 \times \pi^2 \times r/900 \quad (4)$$

(in the formula, N represents a number of rotation per minute (min$^{-1}$), r represents a radius to the tip of rotation (m), and π represents a circular constant.)

The product of the centrifugal acceleration and the treatment time is preferably 2,000 G·hr or more, more preferably 3,000 G·hr or more, further preferably 4,000 G·hr or more, from the viewpoint of reducing the amount of polymer that tends to be free or the like, and from the same viewpoint, the product of the centrifugal acceleration and the treatment time is preferably 450,000 G·hr or less, more preferably 420,000 G·hr or less, further preferably 390,000 G·hr or less. In view of the above, the product of the centrifugal acceleration and the treatment time is preferably from 2,000 to 450,000 G·hr, more preferably from 3,000 to 420,000 G·hr, further preferably from 4,000 to 390,000 G·hr.

As the centrifugal separation apparatus, a centrifugal settler, in which a rotation bowl having no pores is rotated at high speed so as to allow a suspending substance to be centrifugally settled, is suitably used. Examples of the centrifugal settler include those of centrifugal settling tube-type, cylinder-type, separation plate-type, basket-type, screw decanta-type, and the like (for example, refer to "Kagaku-souchi Bin-ran (Handbook of Chemical Equipments)", edited by Society for Chemical Engineers, Japan, 2nd printing of revised 2nd edition, Maruzen Co., Ltd., Apr. 5, 1996, page 798).

<Process (4)>

In process (4), the precipitation obtained in process (3) is redispersed in an aqueous medium. The redispersion is preferably carried out by performing a dispersion treatment after adding water to the obtained precipitation. The method of performing dispersion is the same as that described in process (1). In the present specification, the "aqueous medium" includes water substantially as a main component, but a solvent or additives used in the ink may be included therein.

<Build-Up Method>

In the following, the build-up method is explained. In preparing the ink composition according to the invention, one preferred embodiment is a method of including the water-insoluble polymer in at least one of a solution in which a colorant is dissolved or an aqueous medium, and then allowing the solution and the aqueous medium to contact each other in order to allow particles of the colorant to precipitate. The colorant is preferably dissolved in solution in the presence of alkali or acid, according to the purpose of dissolving the colorant.

The solvent in which the colorant is dissolved is preferably a solvent having a degree of solubility of 5% by mass or higher with respect to water, more preferably a solvent that freely mix with water. Specific examples of the preferred solvent include dimethyl sulfoxide, dimethylimidazolidinone, sulfolane, N-methylpyrrolidone, dimethylformamide, acetonitrile, acetone, dioxane, tetramethyl urea, hexamethyl phosphoramide, hexamethyl phosphorotriamide, pyridine, propionitrile, butanone, cyclohexanone, tetrahydrofuran, tetrahydropyran, ethyleneglycol diacetate and γ-butyrolactone. Among these, dimethylsulfoxide, N-methylpyrrolidone, dimethylformamide, dimethylimidazolidinone, sulfolane, acetone, acetonitrile and tetrahydrofuran are preferred. Exemplary acidic solvents include concentrated sulfuric acid, phosphoric acid, concentrated hydrochloric acid, concentrated nitric acid and methane sulfonic acid, and among which concentrated sulfuric acid and methane sulfonic acid are preferred. These solvents may be used alone or in combination of two or more kinds.

The proportion of the solvent with respect to the colorant dissolved therein is not particularly limited, but in order to achieve even more favorable dissolved state of the colorant, ease of formation of the desired particle diameter, and even more favorable color density of the aqueous dispersion, the solvent is preferably used in an amount of from 2 to 500 parts by mass, more preferably from 5 to 100 parts by mass, with respect to 1 part by mass of the colorant.

The aqueous medium is water or a mixed solvent of water and an organic solvent that is soluble in water. The organic solvent is preferably added when it is not possible to dissolve the pigment or the dispersant uniformly by using water alone, or when it is not possible to obtain a certain degree of viscosity that is necessary to pass through the path by using water alone.

The embodiments of mixing the solution in which the colorant is dissolved and the aqueous medium are not particularly limited, and examples thereof include an embodiment in which the solution containing the colorant is added in the aqueous medium while stirring the aqueous medium, and an embodiment in which the solution and the aqueous medium are supplied to flow channels each having a certain length in the same longitudinal direction, and colorant microparticles are allowed to precipitate by contacting the solution and the aqueous medium while passing through the flow channels. In the former case (embodiment of carrying out stirring and mixing), an embodiment in which the solution containing the colorant is added to the aqueous medium by introducing a supply tube or the like to the aqueous medium, i.e., addition-in-solution method, is preferred. More specifically, the addition-in-solution method may be performed by using a device described in paragraphs [0036] to [0047] of International Publication No. WO2006/121018. In the latter case (embodiment in which the solution and the aqueous medium are mixed using the flow channels), for example, a microreactor described in paragraphs [0049] to [0052] and FIGS. 1 to 4 of JP-A No. 2005-307154 or paragraphs [0044] to [0050] of JP-A No. 2006-78637 may be used.

Further, the build-up method preferably includes a process of heating the colorant particles after the formation of the same. The objects of introducing the heating process include the effects described in Japanese Patent No. 3936558, and the effect of obtaining colorant particles having a stable crystal structure, i.e., Ostwald ripening. By performing this process, the viscosity of the dispersion can be lowered, and the light fastness and the dispersion stability of the colorant can be improved.

The heating is preferably carried out at 30 to 110° C. with a heating time of from 10 to 360 minutes. The heating process is preferably carried out after obtaining a dispersion in which microparticles are formed by mixing the water-insoluble colorant solution and the aqueous medium.

In the build-up method, it is possible to form a flocculation in which microparticles of the colorant are allowed to flocculate such that they can redisperse, by using the dispersion including water, colorant particles and water-insoluble polymer, and then separating the flocculation from the dispersion. Further, by imparting redispersibility to the flocculation, the flocculation can be canceled and redispersed into a redispersed medium.

The following are details of the process of forming a flocculation in which particles of colorant are allowed to flocculate such that they redisperse, and then separating the flocculation from the dispersion; and the process of redispersing the flocculation by canceling the flocculation of the same.

As described below, the flocculation of particles is preferably formed by treating a mixed solution in which colorant particles are precipitated with an acid, preferably by adding an acid during the formation of the flocculation. The treatment using an acid preferably includes allowing the particles to flocculate by using an acid and separating the same from the solvent (dispersion medium), condensing the same, removing the solvent, and desalting (removal of acid) the same. By making the system acidic, the degree of electrostatic repulsion force derived from acidic hydrophilic portions can be lowered, and therefore the particles can be flocculated.

The acid used here is not particularly limited as long as it can allow microparticles which are hard to precipitate to flocculate to form slurry, paste, powder, particles, cake (mass), sheets, short fibers, flakes or the like, and then efficiently separate the same from the solvent by an ordinary separation method. It is more preferred to use an acid that forms a water-soluble salt with an alkali, and the acid in itself is preferably highly soluble in water. In order to efficiently carrying out the desalting, the amount of acid to be added is preferably as small as possible within a range in which the particles can flocculate. Specific examples of the acid include hydrochloric acid, sulfuric acid, nitric acid, acetic acid, phosphoric acid, trifluoroacetic acid, dichloroacetic acid and methane sulfonic acid. Among these, hydrochloric acid, acetic acid and sulfuric acid are particularly preferred. The aqueous dispersion of pigment particles, which are made to be able to easily separate with an acid, can be readily separated by using a centrifuge, a filtration apparatus or a slurry solid-liquid separator. During the separation, the degree of desalting or solvent removal may be adjusted by adding water as a diluent, or by increasing the number of decantation and washing with water. The formation of the flocculation may also be performed in combination with an inorganic compound such as alum or a polymer flocculating agent.

The flocculation obtained in the above process may be used directly as paste or slurry with high water content, or as necessary, the flocculation may be used as microparticles formed through a drying method such as spray drying, centrifugal separation drying, filtration drying or freeze drying.

One example of the redispersion treatment is an alkali treatment. Specifically, the particles that are allowed to flocculate by using an acid are preferably neutralized with an alkali and redispersed in water, while the particles maintain the primary particle diameter at the time of precipitation. Since the desalting and the solvent removal are already performed, a concentrated base that includes a low amount of impurities may be obtained. The alkali used here is not particularly limited, as long as it functions as a neutralizer with respect to a dispersant having an acidic hydrophilic portion and increases the solubility in water. Specific examples of the alkali include organic amines such as aminomethyl propanol, dimethylamino propanol, dimethylethanolamine, diethyltriamine, monoethanolamine, diethanolamine, triethanolamine, butyldiethanolamine and morpholine, hydroxides of an alkali metal such as sodium hydroxide, lithium hydroxide and potassium hydroxide, and ammonia. These compounds may be used alone or in combination of two or more kinds The amount of the alkali to be used is not particularly limited as long as the flocculated particles can be stably redispersed in water. However, when an alkali is used for printing inks or inks for an inkjet printer, the amount thereof is preferably such that the value of pH is from 6 to 12, more preferably from 7 to 11, since the alkali may cause corrosion of members of the printer.

Further, a method other than the alkali treatment may be employed depending on the type of the dispersant used in the particle precipitation, and examples thereof include redispersion treatments in which a known low-molecular dispersant or a known high-molecular dispersant is used. These redispersion treatments may be performed in combination with the alkali treatment.

Further, during the process of redispersing the flocculated particles, it is possible to facilitate the redispersion by adding a water-soluble organic solvent as a medium for redispersion. The organic solvent that may be specifically used is not particularly limited, and examples thereof include lower alcohols such as methanol, ethanol, n-propanol, isopropanol, n-butanol, isobutanol, and tert-butanol, aliphatic ketones such as acetone, methyl ethyl ketone, methyl isobutyl ketone and diacetone alcohol, ethylene glycol, diethylene glycol, triethylene glycol, glycerin, propylene glycol, ethylene glycol monomethyl-or-monoethyl)ether, propylene glycol methyl ether, dipropylene glycol methyl ether, tripropylene glycol methyl ether, ethylene glycol phenyl ether, propylene glycol phenyl ether, diethylene glycol monomethyl-or-monoethyl ether, diethylene glycol monobutyl ether, triethylene glycol monomethyl-or-monoethyl ether, N-methylpyrrolidone, 2-pyrrolidone, dimethyl formamide, dimethyl imidazolidinone, dimethyl sulfoxide and dimethyl acetamide. These compounds may be used alone or in combination of two or more kinds. Further, when preparing an aqueous dispersion by redispersing the pigment particles, the amount of water is preferably from 20 to 99% by mass, more preferably from 30 to 95% by mass. The amount of water-soluble organic solvent is preferably from 0.1 to 50% by mass, more preferably from 0.5 to 30% by mass.

As necessary, the addition of water, alkali and water-soluble organic solvent to the flocculated particles may be performed by using a dispersing machine such as a stirrer, a mixer, a sand mill, a bead mill, a ball mill or a dissolver, or an ultrasonic dispersing machine. In particular, when a paste or slurry of organic pigment with high water content is used, water is not necessarily added. Further, for the purposes of increasing the efficiency of redispersion or removing unnecessary water-soluble organic solvent, excess alkali or the like, heating, cooling, distillation or the like may be performed.

The dispersion obtained by the build-up method exhibits excellent dispersion stability and includes a significantly low amount of free polymer, and is therefore suitably used for the ink composition according to the invention.

(Ink Composition Including Water-Insoluble Polymer Particles Containing Colorant)

The content of the colorant in the ink composition according to the invention is 1.0% by mass or more, preferably from 1.0 to 8.0% by mass, more preferably from 1.5 to 7.0% by mass, further preferably from 2.5 to 5.0% by mass, with respect to the ink composition, from the viewpoint of improving print density.

The amount of free polymer in the ink composition is 1.0% by mass or less, preferably 0.75% by mass or less, more preferably 0.40% by mass or less, further preferably 0.30% by mass or less, with respect to the ink composition, and most preferably not included at all, from the viewpoint of improving discharge stability and cleanability.

The mass ratio of free polymer to adsorbing polymer (free polymer/adsorbing polymer) is preferably 0.23 or less, more preferably 0.20 or less, further preferably 0.15 or less, from the viewpoint of improving discharge stability and cleanability.

In the ink composition, the total content of colorant, adsorbing polymer and free polymer is preferably from 1.5 to 10.0% by mass, more preferably from 2.5 to 8.0% by mass, further preferably from 3.0 to 7.5% by mass, with respect to the ink composition, from the viewpoint of improving discharge stability and cleanability.

The total content of colorant, adsorbing polymer and free polymer may be calculated by a method described in the example.

Specifically, the values obtained by the following method are adopted as the amount of free polymer and the amount of adsorbing polymer in the pigment dispersion.

A pigment dispersion that includes water-insoluble polymer particles containing a colorant is subjected to centrifugal separation using a centrifuge (available from Hitachi-Koki, Ltd., product type: CP56G, rotor type: P50AT2, r: 0.108 m) at 30,000 rpm (centrifugal acceleration: 109,000 G) for 3 hours (327,000 G·hr), and the amount of free polymer is calculated by subtracting the amount of the pigment from the amount of the solid content in the supernatant liquid after removing the obtained precipitation, and this is converted to the amount in the pigment dispersion. Further, the amount of the adsorbing polymer is calculated by subtracting the amount of free polymer from the amount of the polymer in the pigment dispersion. The content of the pigment in the pigment dispersion is calculated by measuring the absorption of light of the supernatant liquid, based on the absorption of light of an aqueous dispersion with a known concentration of the same pigment.

Subsequently, the value as measured in the following manner is adopted as the amount of the free polymer in the ink composition.

The measurement of the amount of the free polymer in the ink composition is carried out by subjecting the ink composition to centrifugal separation using a high-speed centrifuge (trade name: OPTIMA XL100K, available from Beckman Coulter, Inc.) at 80,000 rpm for 1 hour, thereby allowing water-insoluble polymer particles containing a pigment to precipitate and collecting the supernatant liquid. The amount of the water-insoluble polymer in the collected supernatant liquid is quantified using a nuclear magnetic resonance analyzer (trade name: INOVA 400 ($^{13}$C-NMR), available from Varian Technologies Japan Limited). The standard curve is produced by using a dispersant standard product at three points of density.

When preparing the ink composition using the pigment dispersion, a water-soluble organic solvent as described later or the like is added thereto. Therefore, the composition of the solvent in the ink composition is different from that of the pigment dispersion which includes water as a main component of the medium. As a result, the solvent in the ink composition tends to be hydrophobic as compared with the solvent formed from water alone. Accordingly, the amount of the free polymer in the ink composition may be different from that of the pigment dispersion calculated by the above method. Therefore, the amount of the free polymer in the ink composition according to the invention needs to be calculated by measurement using the ink composition in itself.

A water-soluble solvent is preferably used as a component of the ink composition for the purpose of preventing drying, moistening or promoting penetration.

The amount of the water-soluble solvent in the ink composition according to the invention is preferably from 5.0% by mass to 60.0% by mass, more preferably from 10.0% by mass to 50.0% by mass, further preferably from 15.0% by mass to 40.0% by mass, from the viewpoint of preventing drying and promoting penetration.

Further, in the invention, the water-soluble solvent preferably includes a hydrophobic solvent having an SP of 27.5 or less (preferably a hydrophobic organic solvent) and includes a compound represented by the following Formula (III), for the purpose of suppressing curling of the printed material. In that case, the component of "water-soluble solvent having an SP of 27.5 or less" may be the same as "compound represented by Formula (III)". The solubility parameter (SP) of the water-soluble solvent in the invention refers to a value represented by a square root of molecular aggregation energy that can be calculated by a method described in R. F, Fedors, Polymer Engineering Science, 14, p. 147 (1967), and this value is adopted in the invention.

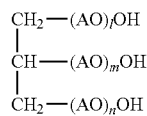

Formula (III)

In Formula (III), l, m and n each independently represent an integer of 1 or greater, and l+m+n=3 to 15. When l+m+n is less than 3, suppression of curling may not be sufficient, and when l+m+n is greater than 15, dischargeability may be impaired. l+m+n is preferably 3 to 12, more preferably 3 to 10. In Formula (III), AO represents an ethyleneoxy group and/or a propyleneoxy group, and a propyleneoxy group is preferred. Each of AO in $(AO)_l$, $(AO)_m$ and $(AO)_n$ may be the same or different.

The following are examples of the water-soluble solvent having an SP of 27.5 or less and examples of the compound represented by Formula (III), together with the SP thereof (shown in the parenthesis). However, the invention is not limited to the following examples.

Diethyene glycol monoethyl ether (22.4)
Diethylene glycol momobutyl ether (21.5)
Triethylene glycol monobutyl ether (21.1)
Dipropylene glycol monomethyl ether (21.3)
Dipropylene glycol (27.2)

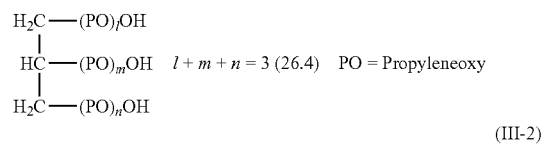

(III-1)

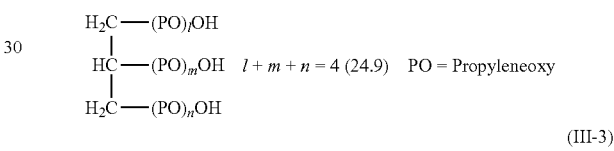

(III-2)

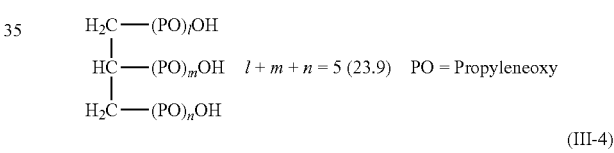

(III-3)

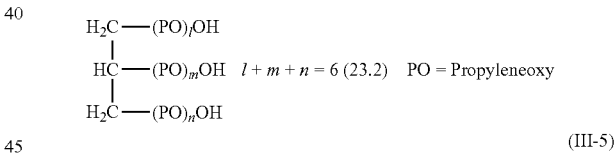

(III-4)

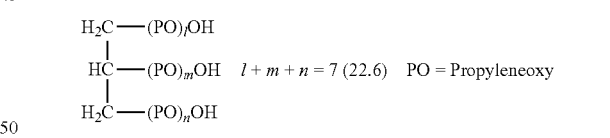

(III-5)

$nC_4H_9O(AO)_4$—H (AO=EO or PO, ratio of EO:PO=1:1) (20.1)
$nC_4H_9O(AO)_{10}$—H (AO=EO or PO, ratio of EO:PO=1:1) (18.8)
$HO(A'O)_{40}$—H (A'O=EO or PO, ratio of EO:PO=1:3) (18.7)
$HO(A''O)_{55}$—H (A''O=EO or PO, ratio of EO:PO=5:6) (18.8)
$HO(PO)_3$—H (24.7)
$HO(PO)_7$—H (21.2)
1,2-hexanediol (27.4)

In the invention, EO and PO each represent an ethyleneoxy group and a propyleneoxy group.

The proportion (content) of the compound represented by Formula (III) in the water-soluble solvent is preferably from 10% by mass to 90% by mass, more preferably from 30% by mass to 90% by mass, particularly preferably from 40% by mass to 90% by mass, with respect to the water-soluble solvent. When the proportion (content) of the compound represented by Formula (III) is within the above range, curling of the printed material may be favorably suppressed.

When the water-soluble solvent having an SP of 27.5 or less, the compound represented by Formula (III), or the like is used in the ink, hydrophobic interaction between the colorant and the water-insoluble polymer may weaken and the amount of the free polymer may increase in some cases (in other words, the amount of the free polymer in the aqueous dispersion of the colorant may differ from the amount of the free polymer in the ink composition). In the invention, when the water-insoluble polymer having a structural unit represented by Formula (1) or Formula (2) is used, detachment of polymer is suppressed even when the water-soluble solvent having an SP of 27.5 or less, the compound represented by Formula (III) or the like is used in the ink. The reason for this is presumed to be that the specific cyclic group in the water-insoluble polymer interacts with the molecules of the colorant and forms a specific adsorption state, whereby a favorable dispersion state in the ink composition is achieved while suppressing detachment of the water-insoluble polymer from the microparticles.

In the invention, a further solvent may be used in combination. Examples of the water-soluble organic solvent that can be used in combination include alkanediols (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol and 4-methyl-1,2-pentanediol; alkyl alcohols having 1 to 4 carbon atoms such as ethanol, methanol, butanol, propanol and isopropanol;

glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether and dipropylene glycol mono-iso-propyl ether; 2-pyrrolidone, N-methyl-2-pyrrolidone, 1,3-dimethyl-2-imidazolidinone, formamide, acetamide, dimethylsulfoxide, sorbit, sorbitan, acetine, diacetine, triacetine and sulfolane. These compounds may be used alone or in combination of two or more kinds For the purpose of using the compound as an anti-drying agent, polyhydric alcohols are useful and examples thereof include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol and 1,2,6-hexanetriol. These compounds may be used alone or in combination of two or more kinds For the purpose of using the compound as a penetrant, polyol compounds are suitably used and examples of aliphatic diols include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol and 2-ethyl-1,3-hexanediol. Among these compounds, preferred examples include 2-ethyl-1,3-hexanediol and 2,2,4-trimethyl-1,3-pentanediol.

Further, agents that are commonly used such as a dispersant, a viscosity adjuster, a deforming agent, an antifungal agent and an antirust agent may be added to the ink composition according to the invention.

The water content in the ink composition according to the invention is preferably from 30 to 90% by mass, more preferably from 40 to 80% by mass, with respect to the ink composition. The surface tension of the ink composition (20° C.) is preferably from 25 to 50 mN/m, more preferably from 27 to 45 mN/m.

The viscosity of the ink composition according to the invention (20° C.) is preferably from 2 to 12 mPa·s, more preferably from 2.5 to 10 mPa·s, further preferably from 2.5 to 6 mPa·s, from the viewpoint of maintaining favorable dischargeability. The measurement of viscosity may be carried out by using an E-type viscometer (RE80, trade name, available from Toki Sangyo CO., Ltd.) at a measurement temperature of 20° C., a measurement time of 1 minute, and a number of times of rotation of 100 rpm, with the use of a standard-type rotor (1°34'×R24).

<Ink Set>

The ink set according to the invention includes at least one kind of the ink composition according to the invention. Exemplary embodiments of the ink set according to the invention include the following (1) to (3).

(1) a combination of plural ink compositions having different colors that can be used for the formation of a multicolor image (for example, a full-color image)

(2) a combination of at least one kind of ink composition and at least one kind of treatment liquid that can form an aggregation upon contact with the ink composition (3) a combination of (1) and (2)

The ink set according to the invention is used for an image formation method in which the aforementioned ink composition is used, preferably for an image formation method as described later. In the following, details of embodiments (1) and (2) are described.

Embodiment (1): The ink set formed from a combination of plural ink compositions having different colors preferably includes a magenta color ink, a cyan color in and a yellow color ink, in order to form a full-color image. In order to adjust the color hue, a black color ink may be further included. Further, inks of other colors than yellow, magenta and cyan, such as red, green, blue and white, and spot color inks (for example, a colorless ink) that are used in the field of printing are also applicable.

The ink compositions of these plural colors may be prepared by appropriately selecting the colorant in the preparation of the ink composition according to the invention.

Embodiment (2): This is an embodiment including at least one kind of ink composition according to the invention and at least one kind of treatment liquid that can form an aggregation upon contact with the ink composition.

(Treatment Liquid)

The treatment liquid is an aqueous composition that can form an aggregation upon contact with the ink composition. Specifically, the treatment liquid at least includes an aggregating component that can form an aggregate when mixed with the ink composition, by allowing particles dispersed in the ink composition such as colorant particles (pigment or the like) to aggregate. The treatment liquid may include a further component, as necessary. By using the treatment liquid together with the ink composition, the speed of inkjet recording can be increased, and an image with high density and high resolution can be obtained even when high-speed recording is performed.

(Aggregating Component)

The treatment liquid includes at least one kind of aggregating component that can form an aggregation upon contact with the ink composition. By mixing the treatment liquid with the ink composition that has been jetted by an inkjet method, aggregation of a pigment or the like that is stably dispersed in the ink composition is promoted. Since the ink composition according to the invention includes a low amount of free polymer, the aggregating component in the treatment liquid can be efficiently used for the aggregation of the colorant. Accordingly, an image with higher density and higher resolution can be obtained even when recording is performed at high speed.

Examples of the treatment liquid include a liquid capable of forming aggregates by changing the pH of an ink composition. At this time, the pH (25 C.°±1° C.) of the treatment liquid is preferably from 1 to 6, more preferably from 1.2 to 5 and still more preferably from 1.5 to 4 from the viewpoint of the aggregating speed of the ink composition. In this case, the pH (25 C.°±1° C.) of the ink composition used in a jetting process is preferably from 7.5 to 9.5 (more preferably from 8.0 to 9.0).

In particular, in the invention, it is preferable that an ink composition having a pH)(25 C.°) of 7.5 or more, and a treatment liquid having a pH)(25 C.°) of from 3 to 5 from the viewpoint of an image density, a resolution and a higher speed of inkjet recording.

One kind of the aggregating component may be used singly, or two or kinds of the aggregating components may be used mixed and used.

The treatment liquid may be formed using at least one of acidic compound as an aggregating component. Examples of the acidic compound include a compound having a phosphoric acid group, a phosphonic acid group, a phosphinic acid group, a sulfuric acid group, a sulfonic acid group, a sulfinic acid group, or a carboxyl group, or a salt thereof (for example, polyvalent metal salt). Among them, a compound having a phosphoric acid group or a carboxyl group is preferable, and a compound having a carboxyl group is more preferable, from the viewpoint of aggregating speed of the ink composition.

The compound having a carboxyl group is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or a derivative of these compounds or a salt (for example, polyvalent metal salt) of these compounds. One kind of these compounds may be used singly, or two or kinds of these compounds may be used together.

The treatment liquid in the invention may include an aqueous solvent (for example, water) in addition to the acidic compound.

The content of the acidic compound in the treatment liquid is preferably from 5% by mass to 95% by mass, more preferably from 10% by mass to 80% by mass, relative to a total mass of the treatment liquid, from the viewpoint of an aggregation effect.

Further, the treatment liquid may be a treatment liquid containing a polyvalent metal salt or polyallylamine, whereby high-speed aggregation can be achieved. Examples of the polyvalent metal salt include salts of alkali earth metals (for example, magnesium and calcium) from the second group of the Periodic Table, salts of transition metals (for example, lanthanum) from the third group of the Periodic Table, salts of metals (for example, aluminum) of the 13th group of the Periodic Table, and salts of lanthanides (for example, neodymium). Examples of the polyallylamine include polyallylamine and a derivative of polyallylamine. As metal salts, a carboxylate salt (a formate salt, an acetate salt, a benzoate salt or the like), a nitrate salt, a chloride salt and a thiocyanate salt are suitable. In particular, a calcium salt or a magnesium salt of carboxylic acids (formic acid, acetic acid, benzoic acid and the like), a calcium salt or a magnesium salt of nitric acid, calcium chloride, magnesium chloride, and a calcium salt or a magnesium salt of thiocyanic acid are preferable.

The content of the metal salt in the treatment liquid is preferably in the range of from 1% by mass to 10% by mass, more preferably in the range of from 1.5% by mass to 7% by mass, and still more preferably in the range of from 2% by mass to 6% by mass.

The viscosity of the treatment liquid is preferably in the range of from 1 mPa·s to 30 mPa·s, more preferably in the range of from 1 mPa·s to 20 mPa·s, still more preferably in the range of from 2 mPa·s to 15 mPa·s, and particularly preferably in the range of from 2 mPa·s to 10 mPa·s, from the viewpoint of aggregation speed of an ink composition.

In addition, the viscosity is measured with VISCOMETER TV-22 (trade name; manufactured by Toki Sangyo Co., Ltd.) under a condition of a temperature of 20° C.

Moreover, the surface tension of the treatment liquid is preferably from 20 mN/m to 60 mN/m, more preferably from 20 mN/m to 45 mN/m, and still more preferably from 25 mN/m to 40 mN/m, from the viewpoint of ink aggregation speed. In addition, the surface tension is measured with AUTOMATIC SURFACE TENSIOMETER CBVP-Z (trade name; manufactured by Kyowa Interface Science Co., Ltd.) under a condition of a temperature of 25° C.

Image Formation Method

The image formation method according to the invention includes a process of forming an image by jetting the ink composition according to the invention or the ink composition of the ink set according to the invention, from plural jetting ports (hereinafter, also referred to as "nozzles") that are arranged in a two-dimensional matrix (hereinafter, also referred to as "ink jetting process"). As necessary, the method may include other processes.

In the image formation method according to the invention, particularly because of the use of the ink composition according to the invention, occurrence of nozzle clogging due to the ink composition may be suppressed, thereby achieving excellent jetting stability and cleanability.

Ink Jetting Process

In the ink jetting process, an image is formed by jetting the ink composition using an inkjet head having a nozzle plate. In this process, a desired visual image can be formed by selectively applying the ink composition to a recording medium.

Specifically, the image recording utilizing an inkjet method can be performed by jetting, onto a desired recording medium, a liquid composition using application of energy. The desired recording medium may be plain paper, resin coated paper, paper exclusively used for inkjet recording described in JP-A Nos. 8-169172, 8-27693, 2-276670, 7-276789, 9-323475, 62-238783, 10-153989, 10-217473, 10-235995, 10-217597 and 10-337947, film, paper for common use in inkjet and electrophotographic recording, cloth, glass, metal, ceramics or the like. In addition, as the inkjet recording method which is preferably used for the invention, the method described in paragraph Nos. [0093] to [0105] of JP-A No. 2003-306623 can be used.

The inkjet method is not particularly restricted. However, any known methods, for example, a charge control system of jetting an ink by utilizing an electrostatic attractive force; a drop-on-demand system (pressure pulse system) of jetting an ink by utilizing the vibration pressure of a piezoelectric element; an acoustic inkjet system of converting electric signals into acoustic beams, irradiating them to an ink, and jetting the ink by utilizing radiation pressure; or a thermal inkjet (BUBBLEJET (registered trade mark)) system of jetting the ink by utilizing a pressure generated by bubbles formed by heating an ink, may be used.

In addition, the inkjet methods include a system of jetting a large number of small-volume of ink droplets of low concentration ink called photo ink, a system of improving image quality using plural kinds of inks of substantially identical hue and different densities, and a system of using a colorless and transparent ink.

The inkjet head used in the inkjet method may be either an on-demand head or a continuous head. The discharging system is not particularly limited, and specific examples thereof include electromechanical conversion systems (for example, a single cavity type, a double cavity type, a vendor type, a piston type, a shared mode type and a shared wall type), electrothermal conversion systems (for example, a thermal inkjet type and a BUBBLE JET (trade name) type), electrostatic suction systems (for example, an electric-field control type and slit jet type) and discharge systems (for example, a spark jet type). The type of ink nozzles or the like used for the recording by the inkjet method is not particularly limited, and may be appropriately selected according to purposes.

The inkjet method is preferably a line method (single-pass method) in which recording elements are positioned so as to cover the whole region corresponding to one side of a recording medium, from the viewpoint of achieving remarkable effects of the invention in terms of jetting stability and cleanability. In the single-pass method, an image is formed on the entire region of a recording medium by moving a full-line head, which covers the entire region of the recording medium, only once relative to the recording medium. Examples of the single-pass method are described in JP-A No. 2005-96443 and JP-A No. 2005-280346. In other words, in the single-pass method, an image can be recorded on the entire region of a recording medium by scanning the recording medium with a full-line head in a direction perpendicular to a direction in which the elements of the full-line head are arranged. Therefore, a conveyor system such as a carriage used for performing scanning with a shuttle head may be omitted. Further, since only the recording medium is moved without the need for controlling the complicated scan movement of the carriage and the recording medium, the speed of recording can be increased compared with a shuttle method. The image formation method according to the invention is applicable to both of these methods, but in general, the effects of improving jetting accuracy and suppressing corrosion of the nozzle plate due to contact with ink are more remarkable in the single-pass method.

Further, in the ink jetting process in the invention, when the line system is used, by using not only one kind of ink composition, but also two or more kinds of ink compositions, the ink jetting (impinging) interval between previously jetted ink composition droplet (the n th color (n≧1), for example, the second color) and the subsequently jetted ink composition droplet (the n+1 th color (for example, the third color) can be one second or less, thereby performing recording suitably. In the invention, when the ink jetting interval is one second or less using the line system, an image with excellent rubbing resistance and suppressed occurrence of blocking can be obtained at higher recording speed than previous recording speed, while preventing ink bleed or color mixing caused by interference among ink droplets. Further, an image with excellent color hue and image forming property (reproducibility of fine lines or minute portions in an image) can be obtained.

The amount of ink droplets jetted from an inkjet recoding head is preferably from 0.5 pL to 6 pL (picoliter), more preferably from 1 pL to 5 pL, and still more preferably from 2 pL to 4 pL from the viewpoint of obtaining a high-resolution image.

—Inkjet Head—

In the image formation method according to the invention, the inkjet head at least includes a nozzle plate. FIG. 1 is a schematic sectional view showing an example of internal structure of the inkjet head.

As shown in FIG. 1, inkjet head 200 includes nozzle plate 11 having discharge ports (nozzles) and ink supply unit 20 positioned to the side opposite to the discharge direction of the nozzle plate. Nozzle plate 11 includes plural discharge ports 12 from which ink is discharged.

Ink supply unit 20 includes plural pressure chambers 21 communicating with each of discharge ports 12 of nozzle plate 11 via nozzle communication path 22; plural ink supply paths 23 that supply ink to each of plural pressure chambers 21; common liquid reservoir 25 that supplies ink to plural ink supply paths 23; and pressure generating unit 30 that deforms each of plural pressure chambers 21.

Ink supply path 23 is formed between ink supply unit 20 and nozzle plate 11 such that ink that has been supplied to common liquid reservoir 25 is delivered. Since ink supply path 23 connects with one end of supply adjustment path 24 that connects ink supply path 23 with pressure chamber 21, it is possible to deliver ink to pressure chamber 21 from ink supply path 23 while controlling the amount of the ink to a desired amount. Plural supply adjustment paths 24 are provided to ink supply path 23, and ink is supplied to pressure chamber 21 that is positioned adjacent to pressure generating unit 30 via ink supply path 23.

In this way, a large amount of ink can be supplied to plural discharge ports.

Pressure generating unit 30 is an actuator (piezoelectric element) formed by layering, from the side of pressure chamber 21, vibration plate 31, adhesive layer 32, lower electrode 33, piezoelectric material layer 34 and upper electrode 35. Electric wirings that supply external driving signals are connected to pressure generating unit 30 so that it can be driven. The piezoelectric material layer 34 is connected to vibration plate (pressure application plate) 31 that forms the top surface of pressure chamber 21, together with the electrode. When a voltage is applied to the electrode, the actuator deforms in response to the image signals and ink is discharged from the nozzle through a nozzle communication path. After ink is discharged, fresh ink is supplied to pressure chamber 21 from common liquid reservoir 25 through ink supply path 23.

Circulation aperture 41 is provided in the vicinity of discharge port 12 such that ink can be collected by circulation path 42 at any time. In this way, increase in viscosity of the ink in the vicinity of discharge ports when discharge is not performed can be prevented.

Figure 2:
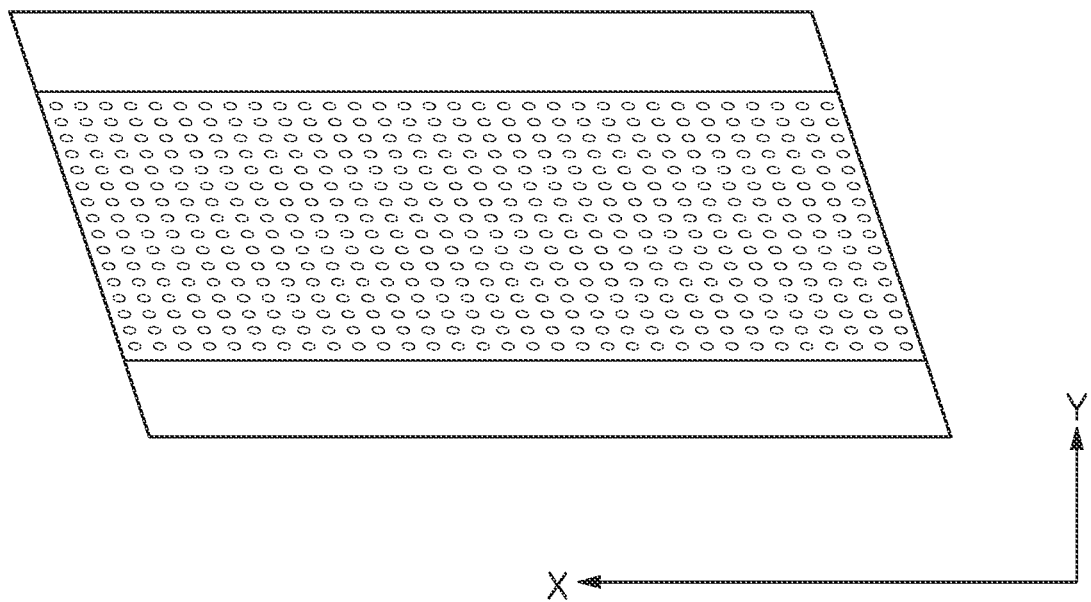
FIG. 2 is a schematic view showing an embodiment of the alignment of jetting ports of a nozzle plate.

As shown in FIG. 2, nozzle plate 11 has 32×60 discharge ports (nozzles) arranged in a two-dimensional manner. For example, this nozzle plate is formed from silicon and has a structure in which silicon is exposed at the inner side of nozzles and the surface of the nozzle plate from which ink is discharged. In FIG. 2, direction Y corresponds to a direction in which a recording medium is delivered (vertical scanning direction) and direction X corresponds to the longer side of the line head (main scanning direction).

By using this nozzle plate, it is possible to record a high quality image with a resolution of as high as 1200 dpi by a high-speed single-pass method (the recording medium passes once). Specifically, the plural nozzles arranged in a two-dimensional matrix on the nozzle plate create a path structure in which ink supply units fixed on the nozzle plate can discharge a large amount of ink at high frequency (i.e., discharge at high duty).

(Water Repellent Treatment of Inkjet Head Nozzles)

In the recording head, the surface of nozzles are more preferably subjected to a water repellent treatment as described in JP-A No. 2002-292878, from the viewpoint of improving discharge stability and cleanability. For example, a member formed from a fluorine-based resin, a fluorine-based resin plate having a monolayer structure, a member (plate) having a multilayer structure of two or more layers in which a fluorine-based resin layer is formed on the surface of the support, or the like may be used.

Materials that can be used for the member formed from a fluorine-based resin or the fluorine-based resin layer include known fluorine-based resins such as a fluorocarbon resin including —$CF_2$— in its main chain and —$CF_3$ at its terminals, a fluorosilicone resin including —$SiF_2$— in its main chain and —$SiF_3$ at its terminals, and a hydrofluorocarbon resin or a hydrofluorosilicone resin formed by substituting part of fluorine atoms of the fluorocarbon resin or the fluorosilicone resin with hydrogen atoms.

More specifically, exemplary materials for the member formed from a fluorine-based resin or the fluorine-based resin layer include fluorine-based resins such as PTFE (polytetrafluoroethylene), PFA (tetrafluoroethylene perfluoroalkylvinylether copolymer), FEP (tetrafluoroethylene hexafluoropropylene copolymer) and ETFE (tetrafluoroethylene copolymer). Among these, PTFE is particularly preferred.

In the invention, water repellency refers to a property of a surface having a larger contact angle than a contact angle with respect to water, which is shown on a surface of a commonly known bulk material. Specifically, a PFA resin has the largest contact angle (approximately 115° among the bulk materials, and the property of a surface that exhibits a larger contact angle than that of the PFA resin is referred to as super water repellency. Therefore, in the invention, the super water repellent treatment of a surface of the member formed from a fluorine-based resin or the fluorine-based resin layer refers to a treatment performed to a surface of a fluorine-based resin, whereby the fluorine-based resin exhibits a larger contact angle than the original contact angle of the resin. Accordingly, in the invention, the contact angle with respect to water is preferably 120° or more, but may be 150° or more, or 170° or more. The upper limit of the contact angle is not particularly limited.

In the invention, the super water repellent treatment of the surface of the member formed from a fluorine-based resin or the fluorine-based resin layer is not particularly limited, as long as super water repellency can be imparted to a surface of the fluorine-based resin. Exemplary methods of the treatment are described in "Molded Fluororesin Object Having Modified Surface Layer, Surface Treatment of Fluororesin and Apparatus Thereof (JP-A No. 2000-17091)" or "Effects of Ar Ion Implantation on Super Water Repellency of Fluororesin (Proceedings of the 15th Symposium on Surface Layer Modification by Ion Implantation) and the like. Further, the hydrophilic treatment performed in the invention is not particularly limited as long as hydrophilicity can be imparted to a surface of the fluorine-based resin, and exemplary methods of the treatment are described in "Advanced Technologies of Surface Modification of Fluororesin (Nitto Technical Report, Vo. 34, No. 1, <May, 1996))".

Recording Medium

The inkjet recording method of the invention records an image on a recording medium.

The recording medium is not particularly restricted, and general printing paper, which is mainly made of cellulose such as so-called high-quality paper, coat paper, art paper or the like used in the general offset printing, may be used.

Recording media that are generally commercially available can be used as the recording medium, and examples include high-quality paper (A) such as Prince WOOD FREE (trade name, produced by Oji Paper Co., Ltd.), SHIRAOI (trade name, produced by Nippon Paper Industries Co., Ltd.) and New NPI High Quality (trade name, produced by Nippon Paper Industries Co., Ltd.), very light-weight coated paper such as EVER LIGHT COATED (trade name, produced by Oji Paper Co., Ltd.) and AURORA S (trade name, produced by Nippon Paper Industries Co., Ltd.), light-weight coated paper (A3) such as TOPKOTE (L) (trade name, produced by Oji Paper Co., Ltd.) and AURORA L (trade name, produced by Nippon Paper Industries Co., Ltd.), coated paper (A2, B2) such as TOPKOTE PLUS (trade name, produced by Oji Paper Co., Ltd.) and AURORA COAT (trade name, produced by Nippon Paper Industries Co., Ltd.) and art paper (A1) such as KINFUJI (2/SIDE GOLDEN CASK GLOSS) (trade name, produced by Oji Paper Co., Ltd.) and TOKUBISHI ART (trade name, produced by Mitsubishi Paper Mills Limited). Further, different kinds of photographic paper for inkjet recording can be used.

EXAMPLES

Hereinafter, the invention is described in more detail by way of Examples, but the invention is not intended to be limited to these. Particularly, unless otherwise specified, the term "part" and "%" are mass basis.

Production of Water-Insoluble Polymer

Polymer Production Example 1

In a reaction container, 20 parts of methyl ethyl ketone, 0.03 parts of a polymerization chain transfer agent (2-mercaptoethanol) and 10% of 200 parts of the monomers shown in Table 1 were placed and mixed. The container was thoroughly subjected to nitrogen gas substitution, thereby obtaining a mixed solution.

Meanwhile, the remaining 90% of the monomers shown in Table 1 were placed in a dropping funnel, and 0.27 parts of the polymerization chain transfer agent (2-mercaptoethanol), 60 parts of methyl ethyl ketone and 1.2 parts of a radical polymerization initiator (2,2'-azobis(2,4-dimethylvaleronitrile) were placed and mixed. The dropping funnel was thoroughly subjected to nitrogen gas substitution, thereby obtaining a mixed solution.

Under a nitrogen gas atmosphere, the temperature of the mixed solution in the reaction container was raised to 65° C. while stirring, and the mixed solution in the dropping funnel was gradually dropped in the reaction container over 3 hours. After maintaining the resultant for 2 hours at 65° C. from the completion of dropping, a solution prepared by dissolving 0.3 parts of the radical polymerization initiator (2,2'-azobis(2,4- dimethylvaleronitrile) in 5 parts of methyl ethyl ketone was added thereto, and the mixture was further subjected to aging at 65° C. for 2 hours and at 70° C. for 2 hours, thereby obtaining a polymer solution (water-insoluble polymer 1).

The weight average molecular weight of the obtained water-insoluble polymer was measured according to the following method. The result of the measurement is shown in Table 1.

Measurement of Weight Average Molecular Weight (Mw) of Water-Insoluble Polymer

The measurement was conducted by a gel chromatography method using N,N-dimethylformamide containing 60 mmol/L of phosphoric acid and 50 mmol/L of lithium bromide as the solvent, and polystyrene as the standard material. Used columns: available from Tosoh Corporation, TSK-GEL, α-M×2), measurement device: available from Tosoh Corporation (HLC-8120GPC), flow rate: 1 mL/min.

TABLE 1

|  |  | Polymer Production Example 1 |
|---|---|---|
| Type of Monomer (parts by weight of solid content) | (a) methacrylic acid | 16 |
| | (b) styrene macromer | 10 |
| | (c) benzyl methacrylate | 34 |
| | (c) styrene monomer | 10 |
| | (d) PP-800 | 15 |
| | (d) 43PAPE-600B | 15 |

Details of the compounds shown in Table 1 are as follows.

(b) styrene macromer: available from Toagosei Co., Ltd., trade name: AS-6 (S) (number average molecular weight: 6000, polymerizable functional group: methacryloyloxy group)

(d) PP-800: available from NOF Corporation, trade name: BLEMMER PP-800, polypropyleneglycol monomthacrylate (average number of moles of added propylene oxide=12, terminal: hydroxyl group)

(d) 43PAPE-600B: available from NOF Corporation, trade name: BLEMMER 43PAPE-600B, polyethylene glycol polypropylene glycol monomethacrylate (average number of moles of added ethylene oxide=6, average number of moles of added propylene oxide=6, terminal: phenyl group)

Production of Water-Insoluble Polymer

Polymer Production Example 2

(Synthesis of Monomer (C))

To a 200-ml three-neck flask, 16.6 g (0.112 mol) of 4-vinyl benzoic acid, 80 ml of toluene and two drops of N,N-dimethylformamide were placed. While stirring this mixture at room temperature, 9.7 ml (0.14 mol) of thionyl chloride were added and stirred while heating at 60° C. for 2 hours. Thereafter, the system was cooled to around 40° C., and toluene and excess thionyl chloride were removed under reduced pressure, thereby obtaining compound (B). Compound (B) was immediately used for the subsequent reaction without performing further purification.

To a 500-ml three-neck flask, 22.5 g (0.101 mol) of 2-aminoanthraquinone and 110 ml of pyridine were added, and compound (B) was slowly dropped therein using a dropping funnel while stirring under ice-cooling. After stirring for 30 minutes under ice-cooling, the mixture was heated and stirred at 60° C. for 3 hours. Thereafter, the reaction mixture was cooled to room temperature, and water was added while stirring. The crude crystal formed in the reaction mixture was separated by filtration, and was washed with water and methanol. The collected crude crystal was placed in a 500-ml three-neck flask and 500 ml of methanol was added thereto, and this was heated and stirred at 60° C. Thereafter, the crystal was separated by filtration, washed with methanol and dried, thereby obtaining 21.5 g of monomer (C) (yield: 75%). The measurement results of NMR of (monomer (C)) are as follows.

$^1$H-NMR (300 MHz, CDCl$_3$) δ=5.48 (br.d, 1H, J=12.0 Hz), 6.07 (br.d, 1H, J=17.4 Hz), 6.89 (br.dd, 1H, J=12.0, 17.4 Hz), 7.78 (br.d, 2H, J=8.4 Hz), 7.94-8.05 (m, 4H), 8.08 (br.d, 2H, J=8.4 Hz), 8.19-8.24 (m, 1H), 8.29-8.34 (m, 1H), 9.19 (dd, 1H, J=1.5, 6.9 Hz), 13.1 (br.s, 1H).

(Production of Water-Insoluble Polymer 2)

To a 200-ml three-neck flask, 8.9 g (0.085 mol) of styrene, 5.0 g (0.014 mol) of monomer (C), 6.1 g (0.071 mol) of methacrylic acid and 45.7 g of N-methylpyrrolidone were added. While heating this mixture at an internal temperature of 80° C. under a nitrogen flow, a mixed solution of 0.39 g (1.7 mmol) of V-601 (trade name) and 0.5 g of N-methylpyrrolidone were added, and heated at 80° C. and stirred. The mixed solution of 0.39 g (1.7 mmol) of V-601 (trade name) and 0.5 g of N-methylpyrrolidone were added 3 times at an interval of 2 hours. After stirring for another 2 hours at 80° C., the mixture was cooled to room temperature. 600 ml of methanol and 600 ml of water were added to a 3 L stainless bucket, and the obtained mixture of styrene/monomer(C)/methacrylic acid copolymer was slowly dropped therein while stirring. The obtained powder was separated by filtration, thereby obtaining 10.5 g of water-insoluble polymer 2 (acid value: 185, mass average molecular weight: 50,000).

Production of Pigment Dispersion

Dispersion Production Example 1

12.5 parts of the polymer obtained by drying the polymer solution obtained in Polymer Production Example 1 by reducing pressure were dissolved in 113.3 parts of methyl ethyl ketone, and 4.4 parts of a neutralizer (5N sodium hydroxide aqueous solution, degree of neutralization: 80%) and 339.7 parts of ion exchange water were added thereto in order to neutralize the salt-forming groups. Further, 37.5 parts of a copper phthalocyanine pigment (C. I. Pigment Blue 15:4, available from Toyo Ink MFG. Co. Ltd., trade name: LIONOGEN BLUE LX-4033) were added thereto and mixed for 1 hour at 20° C. using a disper wing. The obtained mixture was treated for 6 hours using a sand mill (vessel: zirconia, rotor: zirconia, outer diameter of rotor: 70 mm, beads: zirconia, filling rate of beads: 65%, number of rotation: 2,000 rpm). The resultant was subjected to a filtration treatment using a metal mesh (200 mesh), and the obtained dispersion was subjected to a dispersion treatment (10 passes) using a microfluidizer at a pressure of 140 MPa.

Methyl ethyl ketone was removed from the obtained dispersion at 60° C. under reduced pressure so that the concentration of the pigment was 20%, and part of water was further removed from the dispersion. Pigment dispersion A-1 of pigment-containing polymer particles was thus obtained.

80 parts of the obtained pigment dispersion A-1 were subjected to a centrifugal separation treatment at 200,000 G for 3 hours, and after removing the supernatant liquid, the obtained precipitation was redispersed in 48 parts of ion exchange water. Coarse particles were removed from the pigment dispersion by filtration using a 25-mL syringe with no needle to which a 5-μm filter (acetylcellulose film, outer diameter: 2.5 cm, available from Fujifilm Corporation) was attached, and the concentration of the pigment was adjusted to 15% by adding ion exchange water. Pigment dispersion A-2 of pigment-containing polymer particles was thus obtained.

The concentration of the pigment of the redispersed pigment dispersion A-2 was calculated by measuring the absorption of light based on the absorption of light of pigment dispersion A-1 with a known concentration of the same pigment.

Production of Pigment Dispersion

Dispersion Production Example 2

25.0 parts of the polymer obtained by drying the polymer solution obtained in Polymer Production Example 1 by reducing pressure were dissolved in 115.0 parts of methyl ethyl ketone, and 8.8 parts of a neutralizer (5N sodium hydroxide aqueous solution, degree of neutralization: 80%) and 341.1 parts of ion exchange water were added thereto in order to neutralize the salt-forming groups. Further, 25.0 parts of a copper phthalocyanine pigment (C. I. Pigment Blue 15:4, available from Toyo Ink MFG. Co. Ltd., trade name: LIONOGEN BLUE LX-4033) were added thereto and mixed for 1 hour at 20° C. using a disper wing. The obtained mixture was treated for 6 hours using a sand mill (vessel: zirconia, rotor: zirconia, outer diameter of rotor: 70 mm, beads: zirconia, filling rate of beads: 65%, number of rotation: 2,000 rpm). The resultant was subjected to a filtration treatment using a metal mesh (200 mesh), and the obtained dispersion was subjected to a dispersion treatment (10 passes) using a microfluidizer at a pressure of 140 MPa.

Methyl ethyl ketone was removed from the obtained dispersion at 60° C. under reduced pressure so that the concentration of the pigment was 20%, and part of water was further removed from the dispersion. Pigment dispersion B-1 of pigment-containing polymer particles was thus obtained.

80 parts of the obtained pigment dispersion B-1 were subjected to a centrifugal separation treatment at 200,000 G for 3 hours, and after removing the supernatant liquid, the obtained precipitation was redispersed in 48 parts of ion exchange water. Coarse particles were removed from the pigment dispersion by filtration using a 25-mL syringe with no needle to which a 5-μm filter (acetylcellulose film, outer diameter: 2.5 cm, available from Fujifilm Corporation) was attached, and the concentration of the pigment was adjusted to 15% by adding ion exchange water. Pigment dispersion B-2 of pigment-containing polymer particles was thus obtained.

The concentration of the pigment of the redispersed pigment dispersion B-2 was calculated by measuring the absorption of light based on the absorption of light of pigment dispersion B-1 with a known concentration of the same pigment.

Production of Pigment Dispersion

Dispersion Production Example 3

Pigment dispersion C-1 was obtained in a similar manner to pigment dispersion B-1 obtained in Dispersion Production Example 2, except that the pigment was changed to dimethyl quinacridone (C. I. Pigment Red 122, available from BASF Japan Ltd., trade name: CROMOPHTAL JET MAGENTA DMQ). Thereafter, pigment dispersion C-2 was obtained by subjecting pigment dispersion C-1 to a centrifugal separation treatment under similar conditions of Dispersion Production Example 2.

Production of Pigment Dispersion

Dispersion Production Example 4

13.2 g of unsubstituted quinacridone (C. I. Pigment Violet 19, available from Clariant Japan K.K., trade name: INK JET MAGENTA E5B-02), 6.6 g of water-insoluble polymer 2 obtained in Polymer Production Example 2 (acid value: 185 mgKOH/g, Mw=50,000), 140 g of dimethylsulfoxide and 40.6 g of tetramethylammonium hydroxide as an alkali (hereinafter, referred to as $Me_4NOH$, 25% methanol solution) were mixed and stirred while heating at 40° C. Further, a small amount of $Me_4NOH$ was added so that the pigment and the dispersant were completely dissolved, and stirred. A pigment solution having a deep bluish purple color was thus obtained.

In a 5 L beaker, 2,000 g of ion exchange water was added. The pigment solution obtained in the above process was sucked up by a terumo syringe (product name: SS-50ESZ, available from Terumo Corporation) and a terumo needle (product name: NN-1838R, diameter 1.20 mm×length 38 mm, available from Terumo Corporation) and was immediately ejected into the ion exchange water while stirring the same under ice-cooling, thereby obtaining a pigment dispersion.

After stirring for 30 minutes under ice-cooling, the pigment dispersion was placed in a 2 L three-neck flask and heated for 6 hours at an external temperature of 50° C. Thereafter, the pigment dispersion was cooled to room temperature, and the pH was adjusted to 7.0 by dropping dilute hydrochloric acid, and pigment particles were allowed to flocculate from the pigment dispersion to form a flocculation.

The obtained flocculation was subjected to filtration under reduced pressure using a membrane filter having an average pore diameter of 0.2 μm and then washed twice with ion exchange water, thereby obtaining powder A of the pigment flocculation.

Thereafter, 200 ml of acetone were added to the collected pigment powder A and stirred for 1 hour at room temperature. This was again subjected to filtration under reduced pressure using a membrane filter having an average pore diameter of 0.2 μm and further washed with ion exchange water. A dispersion powder of pigment particles that had been subjected to desalting and solvent removal was thus obtained.

Subsequently, ion exchange water and 1N sodium hydroxide aqueous solution were gradually added to this powder so that the pigment concentration was 10%, and was subjected to an ultrasonic dispersion treatment using an ultrasonic homogenizer (trade name: US-150T, available from Nippon Seiki Co., Ltd.), thereby obtaining pigment dispersion D with a pH adjusted to 9.0.

Next, the properties and performances of the pigment dispersions obtained in Dispersion Production Examples 1 to 4 were measured and evaluated according to the following methods. The results are shown in Table 2.

TABLE 2

|  |  |  | Pigment Dispersion | | | | | | |
|---|---|---|---|---|---|---|---|---|---|
|  |  |  | A-1 | A-2 | B-1 | B-2 | C-1 | C-2 | D |
| Evaluation of solid content in pigment dispersion |  | Pigment (%) | 71.3 | 77.9 | 53.1 | 56.1 | 52.5 | 56.2 | 71.8 |
|  | Polymer (%) | Adsorbing polymer (A) | 15.6 | 19.9 | 33.8 | 40.9 | 32.3 | 39.6 | 28.2 |
|  |  | Free polymer (B) | 13.1 | 2.2 | 14.1 | 3.9 | 15.2 | 4.2 | 0.1 or less |
|  |  | Total (%) | 28.7 | 22.1 | 46.9 | 43.9 | 47.5 | 43.8 | 28.2 |

(Measurement of Solid Content Amount in Pigment Dispersion)

Approximately 10 g of sodium sulfate were placed in a glass petri dish, and approximately 1.2 g of the pigment dispersion were measured and placed therein. The petri dish was allowed to stand at 105° C. under reduced pressure (75 kPa) for 2 hours so as to thoroughly evaporate the moisture. After cooling the same under ordinary temperature and ordinary pressure for 30 minutes, the weight was measured and the amount of solid content in the pigment dispersion was calculated from the amount of weight loss of the solid content.

(Measurement of Amount of Free Polymer and Adsorbing Polymer in Pigment Dispersion)

The pigment dispersion was subjected to centrifugal separation using a centrifuge (available from Hitachi-Koki, Ltd., product type: CP56G, rotor product number: P50AT2, r: 0.108 m) at 30,000 rpm (centrifugal acceleration: 109,000 G)×3 hours (327,000 G·hr).

After removing the obtained precipitation from the supernatant liquid, the amount of the free polymer was calculated by subtracting the content of the pigment from the amount of the solid content in the supernatant liquid, and then converting the amount of free polymer to the amount in the pigment dispersion.

Further, the amount of the adsorbing polymer was calculated by subtracting the amount of the free polymer from the amount of the polymer in the pigment dispersion.

The content of the pigment in the pigment dispersion was obtained by measuring the absorption of light of the supernatant liquid based on the absorption of light of the aqueous dispersion with a known concentration of the same pigment, in a similar manner to Dispersion Production Example 1.

Ink was produced by preparing ink having the composition described in Table 3 using the pigment dispersion obtained in the above process, and then subjecting the same to filtration using a 0.2-μm membrane filter.

TABLE 3

| Composition | Ink | | | | | | | | | | | |
|---|---|---|---|---|---|---|---|---|---|---|---|---|
|  | A | B | C | D | E | F | G | H | I | J | K | L |
| Pigment dispersion | A-2 | A-2 | A-2 | A-2 | A-2 | A-1 A-2 | B-2 | B-2 | B-2 | C-2 | C-2 | D |
| (solid content: parts by mass) | 33 | 33 | 33 | 33 | 33 | 10 20 | 20 | 20 | 20 | 20 | 20 | 40 |
| Glycerin | 10 | 10 | 10 | 10 | 10 | 10 | 10 | 10 | 10 | 10 | 10 | 10 |
| TEGmBE | 10 | 10 | 10 | 10 | 10 | 10 | 10 | 10 | 10 | 10 | 10 | 10 |
| Urea | 5 |  |  |  |  | 5 | 5 |  |  | 5 |  | 5 |
| N-methyl urea |  | 5 |  |  |  |  |  |  |  |  | 5 |  |
| Betaine |  |  | 5 |  |  |  |  | 5 |  |  |  |  |
| 2-methyl pyrrolidone |  |  |  | 5 |  |  |  |  |  |  |  |  |
| Maltitol |  |  |  |  | 5 |  |  |  | 5 |  |  |  |
| Xylitol |  |  |  |  |  |  |  |  |  |  |  |  |
| Sorbitol |  |  |  |  |  |  |  |  |  |  |  |  |
| SURFINOL465 | 1 | 1 | 1 | 1 | 1 | 1 | 1 | 1 | 1 | 1 | 1 | 1 |
| PROXELXL2 | 0.3 | 0.3 | 0.3 | 0.3 | 0.3 | 0.3 | 0.3 | 0.3 | 0.3 | 0.3 | 0.3 | 0.3 |
| Ion exchange water | Balance | Balance | Balance | Balance | Balance | Balance | Balance | Balance | Balance | Balance | Balance | Balance |
| Amount of free polymer (with respect to total mass of ink) | 0.37 | 0.37 | 0.37 | 0.40 | 0.38 | 0.74 | 0.71 | 0.71 | 0.71 | 0.93 | 0.93 | 0.1 or less |
| Notes |  |  |  |  |  | The invention |  |  |  |  |  |  |

| Composition | Ink | | | | | | | | | | | |
|---|---|---|---|---|---|---|---|---|---|---|---|---|
|  | M | N | O | P | Q | R | S | T | U | V | W |  |
| Pigment dispersion | D | A-2 | A-1 A-2 | A-1 | A-1 | B-2 | B-1 | C-1 | D | A-2 | A-2 |  |
| (solid content: parts by mass) | 50 | 33 | 20 7 | 33 | 33 | 20 | 25 | 25 | 40 | 33 | 33 |  |
| Glycerin | 10 | 10 | 10 | 10 | 10 | 10 | 10 | 10 | 10 | 10 | 10 |  |
| TEGmBE | 10 | 10 | 10 | 10 | 10 | 10 | 10 | 10 | 10 | 10 | 10 |  |
| Urea |  |  | 5 | 5 |  |  | 5 | 5 |  |  |  |  |
| N-methyl urea | 5 |  |  |  |  |  |  |  |  |  |  |  |
| Betaine |  |  |  |  |  |  |  |  |  |  |  |  |

TABLE 3-continued

| | | | | | | | | | | | |
|---|---|---|---|---|---|---|---|---|---|---|---|
| 2-methyl pyrrolidone | | | | | | | | | | | |
| Maltitol | | | | | 5 | | | | | | |
| Xylitol | | | | | | | | | | 5 | |
| Sorbitol | | | | | | | | | | | 5 |
| SURFINOL465 | 1 | 1 | 1 | 1 | 1 | 1 | 1 | 1 | 1 | 1 | 1 |
| PROXELXL2 | 0.3 | 0.3 | 0.3 | 0.3 | 0.3 | 0.3 | 0.3 | 0.3 | 0.3 | 0.3 | 0.3 |
| Ion exchange water | Balance | Balance | Balance | Balance | Balance | Balance | Balance | Balance | Balance | Balance | Balance |
| Amount of free polymer (with respect to total mass of ink) | 0.1 or less | 0.37 | 1.10 | 1.26 | 1.26 | 0.71 | 1.08 | 1.63 | 0.1 or less | 0.39 | 0.38 |
| Notes | The invention | Comparative | | | | | | | The invention | | |

Measurement of Amount of Free Polymer in Ink

The ink sample prepared above was subjected to centrifugal separation using a high-speed ultra centrifuge (trade name: OPTIMA XL100K, available from Beckman Coulter, Inc.) at 80,000 rpm for 1 hour so as to allow the pigment to precipitate, and the supernatant liquid was collected. The amount of the water-insoluble polymer in the collected supernatant liquid was quantified by using a nuclear magnetic resonance analyzer (trade name: INOVA 400 ($^{13}$C-NMR), available from Varian Technologies Japan Limited). The standard curve was produced using a dispersant standard product at three points of density.

(Evaluation of Foaming Property and Defoaming Property)

10 g of each of the ink described in Table 3 were placed and sealed in a cylindrical glass container having the size of 2 cm in diameter×10 cm in height, and was shaken 50 times. The foaming property was evaluated by measuring the height from the interface of the foam and the liquid to the highest point of the foam (H), and the defoaming property was evaluated by measuring the time in which the height from the interface of the foam and the liquid to the highest point of the foam (H) was 0.5H. The experiment was carried out at a temperature of 23 to 24° C.

<<Inkjet Image Recording>>

Evaluation of print image using the inks described in Table 3 was carried out by using a printer for evaluation equipped with a line head piezo recording head (nozzle diameter: 20 μm, driving frequency: 30 kHz, ink droplet amount: 3.8 pl, number of nozzles: 512 (number of nozzles per color: 128), at a recording resolution of 1440×1440 dpi (in the invention, dpi refers to the number of dots per 2.54 cm). A4 size paper sheets (trade name: SHIRAOI, available from Nippon Paper Industries Co., Ltd., 64 g/m$^2$) were used as the recording medium.

<Evaluation of Adhesion of Ink to Head (Adhesion Evaluation)>

1 μL of the ink was dropped on a head nozzle member that had been subjected to a water repellent treatment by implanting Ar ions to its PTFE surface, and the ink was dried for 30 minutes at room temperature. Thereafter, 10 μL of the ink which was the same as the ink dropped on the PTFE surface were dropped on the dried ink. 10 seconds after the dropping, the ink droplets on the head nozzle member were wiped off once in one direction by applying load of 200 g, and the ink adhering to the head nozzle member was visually observed. When adhesion of the ink was observed, the operation of dropping 10 μL of the ink on the dried ink, waiting for 10 seconds, and wiping off the ink droplets on the head nozzle member once in one direction by applying load of 200 g, was repeated. The evaluation of adhesion of ink was carried out in accordance with the following criteria. The results are shown in Table 4.

Evaluation Criteria

3: Adhesion of ink was removed by carrying out the operation once.

2: Adhesion of ink was removed by carrying out the operation twice.

1: Adhesion of ink was observed even after carrying out the operation three times.

(Evaluation of Jetting Stability)

Using the printer for evaluation, 2,000 images each having 10 wedge charts of 1 cm×10 cm with spaces therebetween were printed on A4-size recording media in a consecutive manner under an environment of 23° C. and 20% RH. The 10th image and the 2,000th image were compared with each other by visual observation, and the jetting stability was evaluated in accordance with the following evaluation criteria. The results are shown in Table 4.

Evaluation Criteria

3: Printing misdirection or streaks (print defects due to non-ejection) were observed in neither the 10th nor 2,000th image.

2: Printing misdirection was observed in the 2,000th image.

1: Printing misdirection and streaks were observed in the 2,000th image.

(Evaluation of Jetting Recovery)

Using the printer for evaluation, 9 images each having 10 wedge charts of 1 cm×10 cm with spaces therebetween were printed on A4-size recording media in a consecutive manner under an environment of 23° C. and 20% RH. After stopping the printing for 10 minutes, the 10th image was printed. The state of jetting of nozzles and the image at the time of printing the 10th image were visually observed, and the ability of recovery in jetting was evaluated in accordance with the following evaluation criteria. The results are shown in Table 4.

Evaluation Criteria

3: No changes in the state of jetting was observed in all nozzles, and occurrence of streaks in the image (print defects due to nozzle malfunction) was observed in less than 2% by number of the nozzles.

2: Occurrence of streaks was observed in from 3% to less than 10% by number of the nozzles.

1: Occurrence of streaks was observed in not less than 10% by number of the nozzles.

<Evaluation of Cleanability>

Using the printer for evaluation, 2,000 images each having 10 wedge charts of 1 cm×10 cm with spaces therebetween were printed on A4-size recording media in a consecutive manner under an environment of 23° C. and 20% RH. Thereafter, a 20% diethylne glycol aqueous solution with a pH adjusted to 8.2 by sodium hydrogen carbonate was applied to a nozzle surface, and a wiping operation (cleaning operation)

was carried out once using a rubber blade. After the wiping, 20 images each having 10 wedge charts of 1 cm×10 cm with spaces therebetween were printed on A4-size recording media in a consecutive manner under an environment of 23° C. and 20% RH, and the ability of recovery in jetting was confirmed by visually observing the obtained images. Subsequently, the line head was detached from the printer, and the cleanability was evaluated by observing the jetting surface of the head in accordance with the following evaluation criteria. The results are shown in Table 4.

Evaluation Criteria

3: No ink residue was observed on the jetting surface of the head, and the jetting was stable.

2: Ink residue was not observed on the jetting surface of the head, but dropping of the ink occurred in the printed images.

1: Ink residue was observed on the jetting surface of the head, and dropping of the ink occurred in large numbers in the printed images.

TABLE 4

| Ink | Foaming property (cm) | Defoaming property (min) | Adhesion to head nozzle member | Jetting stability | Jetting recovery | Cleanability | Notes |
|---|---|---|---|---|---|---|---|
| A | 6 | 3 | 3 | 3 | 3 | 3 | The invention |
| B | 8 | 5 | 3 | 3 | 3 | 3 | |
| C | 6 | 3 | 3 | 3 | 3 | 3 | |
| D | 8 | 7 | 3 | 3 | 3 | 2 | |
| E | 7 | 4 | 3 | 3 | 3 | 2 | |
| F | 6 | 6 | 3 | 2 | 3 | 3 | |
| G | 7 | 8 | 3 | 3 | 3 | 3 | |
| H | 8 | 8 | 3 | 3 | 2 | 3 | |
| I | 8 | 6 | 2 | 3 | 3 | 2 | |
| J | 8 | 8 | 2 | 3 | 3 | 3 | |
| K | 8 | 9 | 2 | 3 | 3 | 2 | |
| L | 5 | 3 | 3 | 3 | 3 | 3 | |
| M | 5 | 3 | 3 | 3 | 3 | 3 | |
| N | 6 | 7 | 1 | 1 | 1 | 1 | Comparative |
| O | 7 | 17 | 1 | 2 | 1 | 2 | |
| P | 7 | 20 | 1 | 1 | 1 | 2 | |
| Q | 8 | 21 | 1 | 1 | 1 | 2 | |
| R | 6 | 10 | 1 | 1 | 1 | 1 | |
| S | 8 | 15 | 2 | 2 | 1 | 2 | |
| T | 9 | 23 | 1 | 1 | 1 | 1 | |
| U | 5 | 3 | 1 | 2 | 1 | 1 | |
| V | 6 | 4 | 3 | 3 | 3 | 2 | The invention |
| W | 7 | 5 | 3 | 3 | 3 | 2 | |

TABLE 5

| Ink set | | Ink M | Ink J | Ink T |
|---|---|---|---|---|
| Primary color (base) | | Ink M | Ink J | Ink T |
| Secondary color (spotted on the primary color) | | Ink A | Ink N | Ink P |
| Evaluation of secondary color | | 3 | 2 | 1 |

As is clear from Table 5, the secondary color images formed by using the ink set including the ink composition according to the invention were favorable.

According to the invention, an ink composition that exhibits excellent jetting stability and cleanability, an ink set including this ink composition, and an image formation method using this ink composition may be provided.

Embodiments of the present invention include, but are not limited to, the following.

<1> An ink composition comprising a wetting agent and water-insoluble polymer particles including a colorant and a water-insoluble polymer, <Evaluation of Secondary Color>

Using the printer for evaluation, 2,000 solid images were printed in a consecutive manner using the ink shown in Table 3 in the combination shown in Table 5, such that the images formed from inks of two colors overlap, at a recording resolution of 1440×1440 dpi under an environment of 23° C. and 20% RH. A4 size paper sheets (trade name: SHIRAOI, available from Nippon Paper Industries Co., Ltd., 64 g/m²) were used as the recording medium. The secondary color of the 2,000th image was evaluated in accordance with the following evaluation criteria. In these evaluation criteria, grade 2 or higher is regarded as tolerable in practical applications. The results are shown in Table 5.

Evaluation Criteria

3: No indirect printing or streaks (print defects due to nozzle malfunction) were observed and a favorable secondary color image was obtained.

2: Streaks occurred at a portion of the secondary color image, and the base color was observed.

1: Streaks occurred at the entire image, and white spots or the base color was observed.

wherein the content of free polymer derived from the water-insoluble polymer is 1.0% by mass or less with respect to the total mass of the ink composition, and the wetting agent is at least one selected from the group consisting of urea, a urea derivative, a pyrrolidone derivative, an alkyl glycine represented by the following Formula 1, glycyl betaine and a sugar:

$$R_1R_2NCH_2COOM \qquad \text{(Formula 1)}$$

wherein in Formula I, $R_1$ and $R_2$ each independently represent a linear or branched alkyl group having 1 to 5 carbon atoms, and M represents a hydrogen atom, an alkali metal atom or an alkaline earth metal atom.

<2> The ink composition according to <1>, wherein the water-insoluble polymer comprises:

a structural unit derived from a monomer having a salt-forming group (a); and at least one of a structural unit derived from a styrenic macromer (b) or a structural unit derived from a hydrophobic monomer (c).

<3> The ink composition according to <1> or <2>, wherein the monomer having a salt-forming group (a) has a carboxyl group, a sulfonic acid group, a phosphoric acid group, an amino group, or an ammonium group.

<4> The ink composition according to any one of <1> to <3>, wherein the hydrophobic monomer (c) is selected from an alkyl (meth)acrylate, an alkyl (meth)acrylamide, or a monomer containing an aromatic ring.

<5> The ink composition according to any one of <1> to <4>, wherein the structural unit derived from the hydrophobic monomer (c) is represented by the following formula (1) or (2):

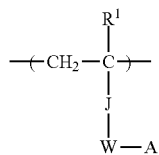

Formula (1)

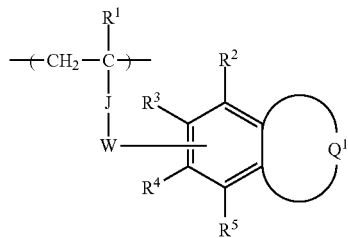

Formula (2)

wherein, in Formula (1) and Formula (2), $R^1$ represents a hydrogen atom or a substituent; one of $R^2$ to $R^5$ represents a single bond to W, and the others each independently represent a hydrogen atom or a substituent; J represents *—CO—, *—COO—, *—CONR$^{10}$—, *—OCO—, a methylene group, a phenylene group or *—C$_6$H$_4$CO—; $R^{10}$ represents a hydrogen atom, an alkyl group, an aryl group or an aralkyl group; W represents a single bond or a divalent linking group; $A^1$ represents a hetero ring group; $Q^1$ represents a group of atoms that is necessary for forming a ring together with the carbon atoms; and *- represents a bonding to the main chain.

<6> The ink composition according to any one of <1> to <5>, wherein the wetting agent is at least one selected from the group consisting of urea, a urea derivative, an alkyl glycine represented by Formula 1, glycyl betaine, maltitol, sorbitol and xylitol.

<7> The ink composition according to any one of <1> to <6>, wherein the wetting agent is at least one selected from urea or a urea derivative.

<8> The ink composition according to any one of <1> to <7>, wherein the content of the wetting agent is from 5% by mass to 30% by mass with respect to the total mass of the ink composition.

<9> The ink composition according to any one of <1> to <8>, wherein the content of the wetting agent is from 5% by mass to 10% by mass with respect to the total mass of the ink composition.

<10> The ink composition according to any one of <1> to <9>, wherein a content ratio of the wetting agent to a total mass of the water-insoluble polymer and the colorant in the ink composition is 0.01 or higher.

<11> The ink composition according to any one of <1> to <10>, wherein a content ratio of the wetting agent to a total mass of the water-insoluble polymer and the colorant in the ink composition is in the range of from 0.1 to 3.0.

<12> An ink set comprising the ink composition according to any one of <1> to <11>.

<13> An image formation method comprising forming an image by jetting the ink composition according to any one of <1> to <11> from plural jetting ports that are arranged in a two-dimensional matrix.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising a wetting agent and water-insoluble polymer particles including a colorant and a water-insoluble polymer,
wherein the content of free polymer derived from the water-insoluble polymer is 1.0% by mass or less with respect to the total mass of the ink composition, and
wherein the wetting agent is at least one selected from the group consisting of urea, a urea derivative, a pyrrolidone derivative, an alkyl glycine represented by the following Formula I, glycyl betaine and a sugar:

$R_1R_2NCH_2COOM$ (Formula I)

wherein in Formula I, $R_1$ and $R_2$ each independently represent a linear or branched alkyl group having 1 to 5 carbon atoms, and M represents a hydrogen atom, an alkali metal atom or an alkaline earth metal atom,
wherein the colorant is a quinacridone pigment,
wherein the water-insoluble polymer comprises a structural unit which is represented by the following Formula (1) or Formula (3):

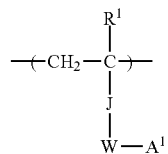

Formula (1)

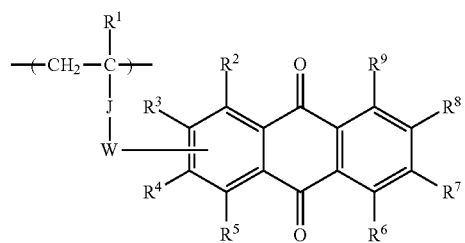

Formula (3)

wherein, in Formula (1) and Formula (3), $R^1$ represents a hydrogen atom or a substituent; in Formula (1) and Formula (3), J represents *—CO—, *—COO—, *—CONR$^{10}$—, *—OCO—, a methylene group, a phenylene group or *—C$_6$H$_4$CO—and R$^{10}$ represents a hydrogen atom, an alkyl group, an aryl group or an aralkyl group; in Formula (1) and Formula (3), W represents a single bond or a divalent linking group; in Formula (1), $A^1$ represents a group selected from acridone or anthraquinone; in Formula (3), one of $R^2$ to $R^5$ represents a single bond to W, and the others each independently represent a hydrogen atom or a substituent; in Formula (3), $R^6$ to $R^9$ each independently represent a hydrogen atom or a substituent.

2. The ink composition according to claim 1, wherein the water-insoluble polymer further comprises:
   a structural unit derived from a monomer having a salt-forming group (a); and
   at least one structural unit derived from a styrenic macromer (b).

3. The ink composition according to claim 2, wherein the monomer having a salt-forming group (a) has a carboxyl group, a sulfonic acid group, a phosphoric acid group, an amino group, or an ammonium group.

4. The ink composition according to claim 1, wherein the structural unit of the water-insoluble polymer is derived from a monomer selected from an alkyl (meth)acrylate, an alkyl (meth)acrylamide, or a monomer containing an aromatic ring.

5. The ink composition according to claim 1, wherein the wetting agent is at least one selected from the group consisting of urea, a urea derivative, an alkyl glycine represented by Formula I, glycyl betaine, maltitol, sorbitol and xylitol.

6. The ink composition according to claim 5, wherein the wetting agent is at least one selected from urea or a urea derivative.

7. The ink composition according to claim 1, wherein the content of the wetting agent is from 5% by mass to 30% by mass with respect to the total mass of the ink composition.

8. The ink composition according to claim 1, wherein the content of the wetting agent is from 5% by mass to 10% by mass with respect to the total mass of the ink composition.

9. The ink composition according to claim 1, wherein a content ratio of the wetting agent to a total mass of the water-insoluble polymer and the colorant in the ink composition is 0.01 or higher.

10. The ink composition according to claim 1, wherein a content ratio of the wetting agent to a total mass of the water-insoluble polymer and the colorant in the ink composition is in the range of from 0.1 to 3.0.

11. An ink set comprising the ink composition according to claim 1.

12. An image formation method comprising forming an image by jetting the ink composition according to claim 1 from plural jetting ports that are arranged in a two-dimensional matrix.

13. The ink composition according to claim 1, wherein the wetting agent is at least one selected from the group consisting of a urea derivative, a pyrrolidone derivative and a sugar.

14. The ink composition according to claim 1, wherein the wetting agent is at least one selected from the group consisting of a pyrrolidone derivative and a sugar.

15. The ink composition according to claim 1, wherein the water-insoluble polymer particles including a colorant have been subjected to a centrifugal separation to reduce an amount of free polymer derived from the water-insoluble polymer.

16. A method for producing the ink composition according to claim 1, the method comprising centrifugal separation to reduce an amount of free polymer derived from the water-insoluble polymer.

* * * * *